US007342932B2

(12) United States Patent
Omae et al.

(10) Patent No.: US 7,342,932 B2
(45) Date of Patent: Mar. 11, 2008

(54) PACKET TRANSMISSION SYSTEM, AND APPARATUS AND METHOD FOR CONTROLLING PACKET TRANSMISSION ROUTE

(75) Inventors: Koji Omae, Yokohama (JP); Takehiro Ikeda, Gose (JP); Ichiro Okajima, Yokohama (JP); Narumi Umeda, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 1129 days.

(21) Appl. No.: 10/216,297

(22) Filed: Aug. 12, 2002

(65) Prior Publication Data

US 2003/0031156 A1 Feb. 13, 2003

(30) Foreign Application Priority Data

Aug. 13, 2001 (JP) ............................. 2001-245591

(51) Int. Cl.
H04L 12/56 (2006.01)
(52) U.S. Cl. ........................................ 370/400; 370/393
(58) Field of Classification Search ................ 370/231, 370/235, 331, 338, 392, 396, 400, 408, 432, 370/474, 395.54, 393
See application file for complete search history.

(56) References Cited

U.S. PATENT DOCUMENTS 6,230,012 B1    5/2001   Willkie et al.
6,973,086 B2 *  12/2005  Patil et al. .................. 370/392

(Continued)

FOREIGN PATENT DOCUMENTS

| EP | 1 009 134 A2 | 6/2000 |
| EP | 1 030 491 | 8/2000 |
| EP | 1 032 178 | 8/2000 |
| KR | 2000-0046185 | 7/2000 |
| WO | WO 00/44183 | 7/2000 |
| WO | WO 01/06734 | 1/2001 |

OTHER PUBLICATIONS

S. F. Foo, et al., "Regional Aware Foreign Agent (RAFA) for Fast Local Handoffs", Internet Engineering Task Force, XP-015011797, Nov. 1998, pp. i-iii and 1-21.

(Continued)

*Primary Examiner*—Doris H. To
*Assistant Examiner*—Feben Micael Haile
(74) *Attorney, Agent, or Firm*—Oblon, Spivak, McClelland, Maier & Neustadt, P.C.

(57) ABSTRACT

A packet transmission system includes a home agent providing a home link and a home address to a mobile node, one or more access routers, each providing a foreign link and a c/o address to the mobile node, and one or more mobility support routers that relay a packet to the destination between the mobile node and the home agent or a counterpart correspondent node. When the mobile node moves into a new foreign link, the corresponding access router transmits a registration request to the home agent and/or the correspondent node. When acquiring a registration request on the way to the destination, each mobility support router stores an entry having the home address of the mobile node and the c/o address contained in the registration request, and produces and transmits a new registration request updating the c/o address to its own address. When receiving a packet addressed to the home address recorded in the entry, the mobility support router encapsulates this packet to produce a tunneling packet and relays the tunneling packet to the c/o address that is recorded in the entry in association with the home address, thereby correctly forwarding the data packet to the destination.

32 Claims, 21 Drawing Sheets

U.S. PATENT DOCUMENTS

2001/0014917 A1* 8/2001 Ishiyama et al. ........... 709/227
2001/0046223 A1* 11/2001 Malki et al. ................ 370/338
2004/0100951 A1* 5/2004 O'neill ....................... 370/389

OTHER PUBLICATIONS

Farid Adrangi, et al., "Mobile IPv4 Traversal Across NAT and VPN Gateways", XP-015009933, Jul. 2001, pp. 1-30 and cover page.

Gihwan Cho, et al., "An Efficient Location and Routing Scheme for Mobile Computing Environments", IEEE Journal on Selected Areas in Communications, XP-000499093, vol. 13, No. 5, Jun. 1995, pp. 868-879.

Pravin Bhagwat, et al., "Network Layer Mobility: An Architecture and Survey", IEEE Personal Communications, XP-000593928, vol. 3, No. 3, Jun. 1996, pp. 54-64.

* cited by examiner

TRANSMISSION ROUTE CONTROL PACKET

PACKET ADDRESSED TO HOME ADD.

TUNNELING PACKET

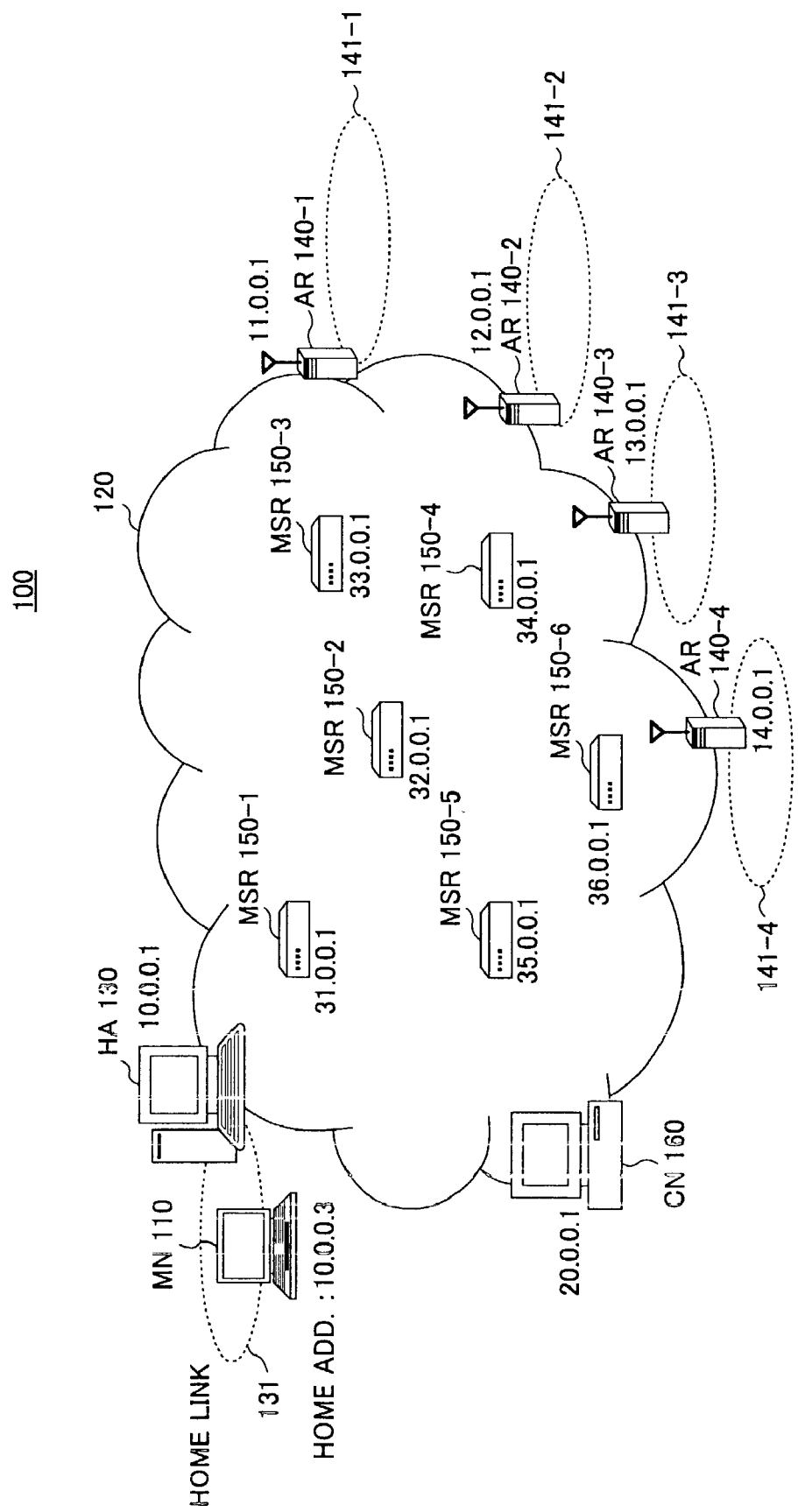

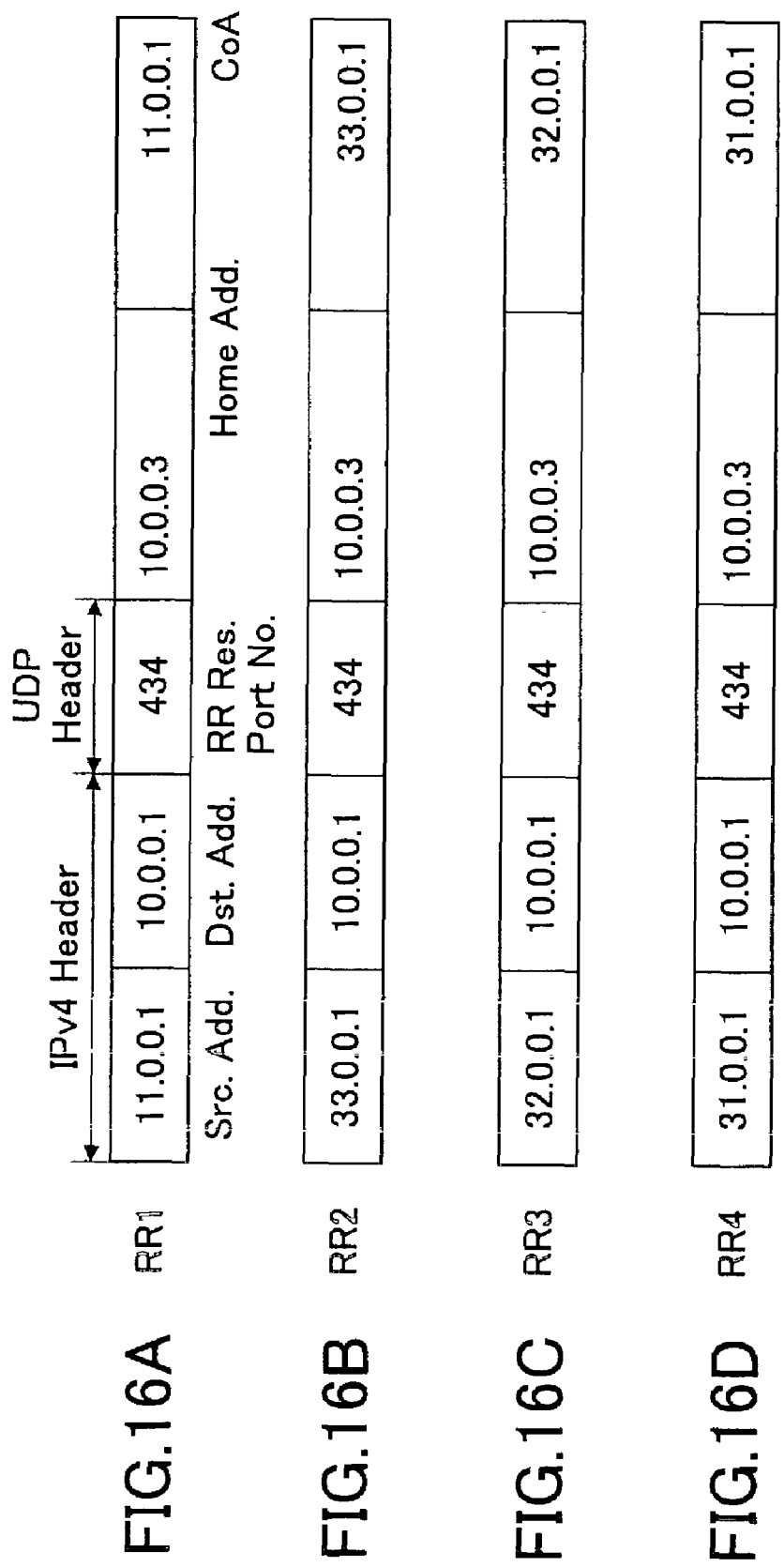

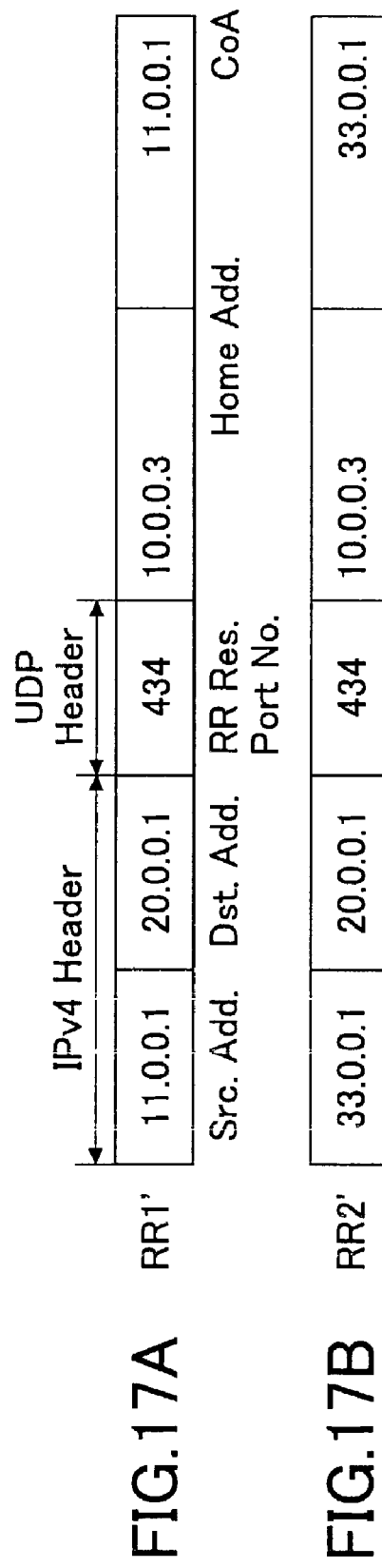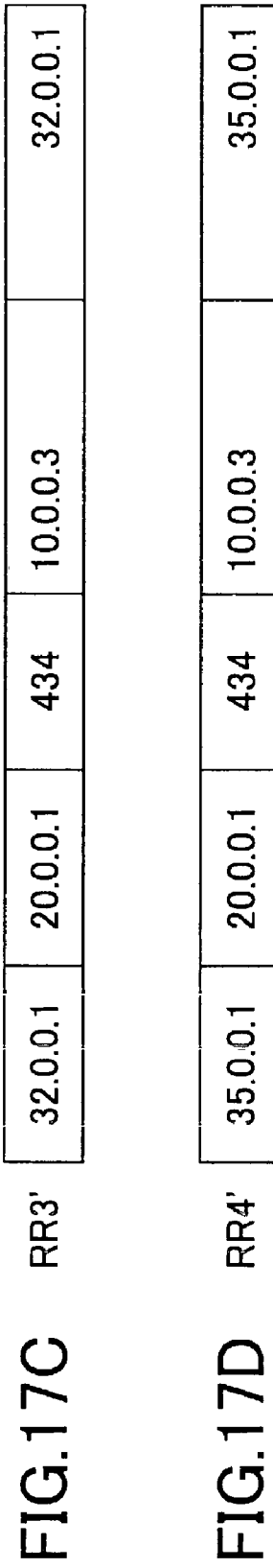
FIG.17A FIG.17B FIG.17C FIG.17D

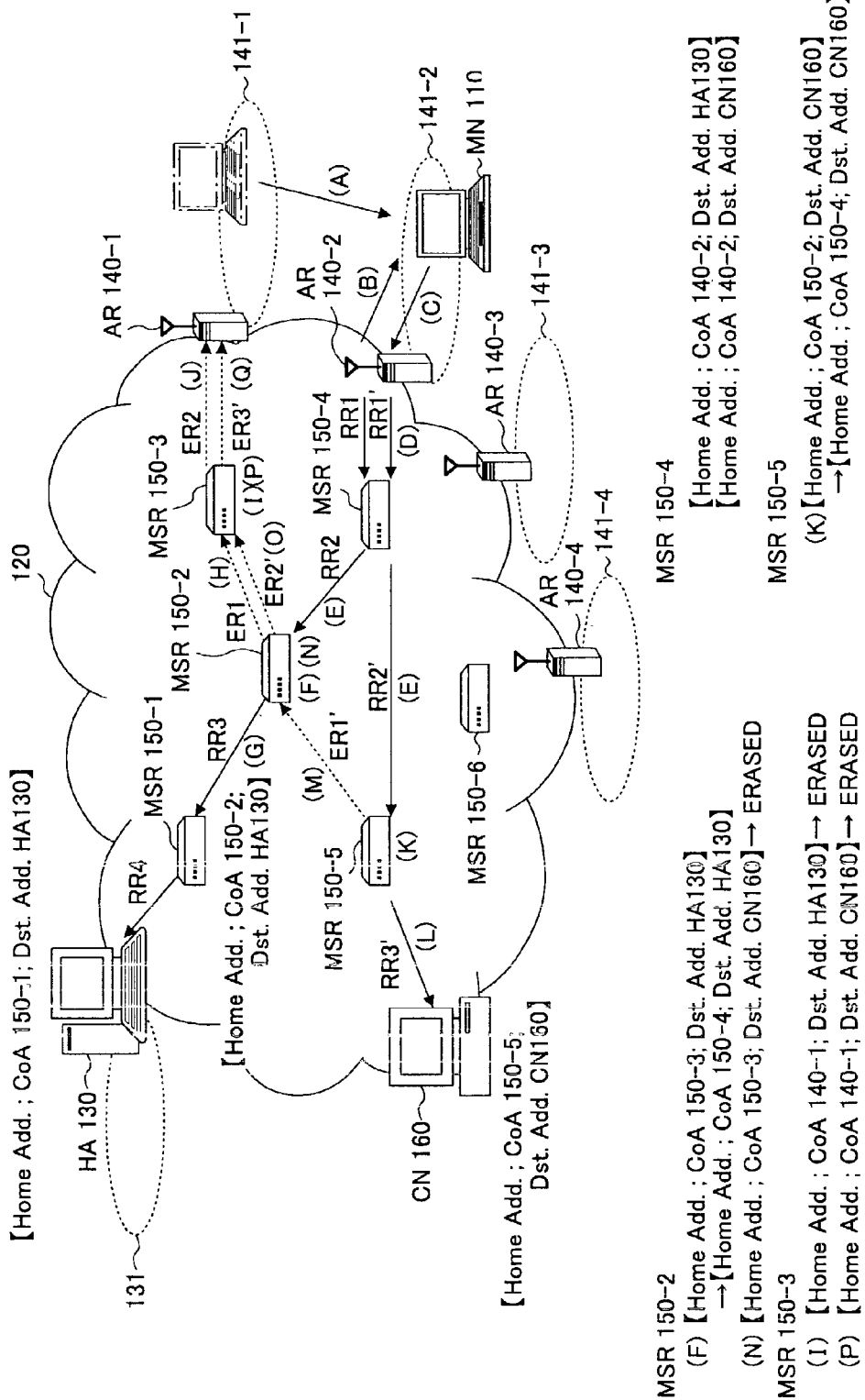

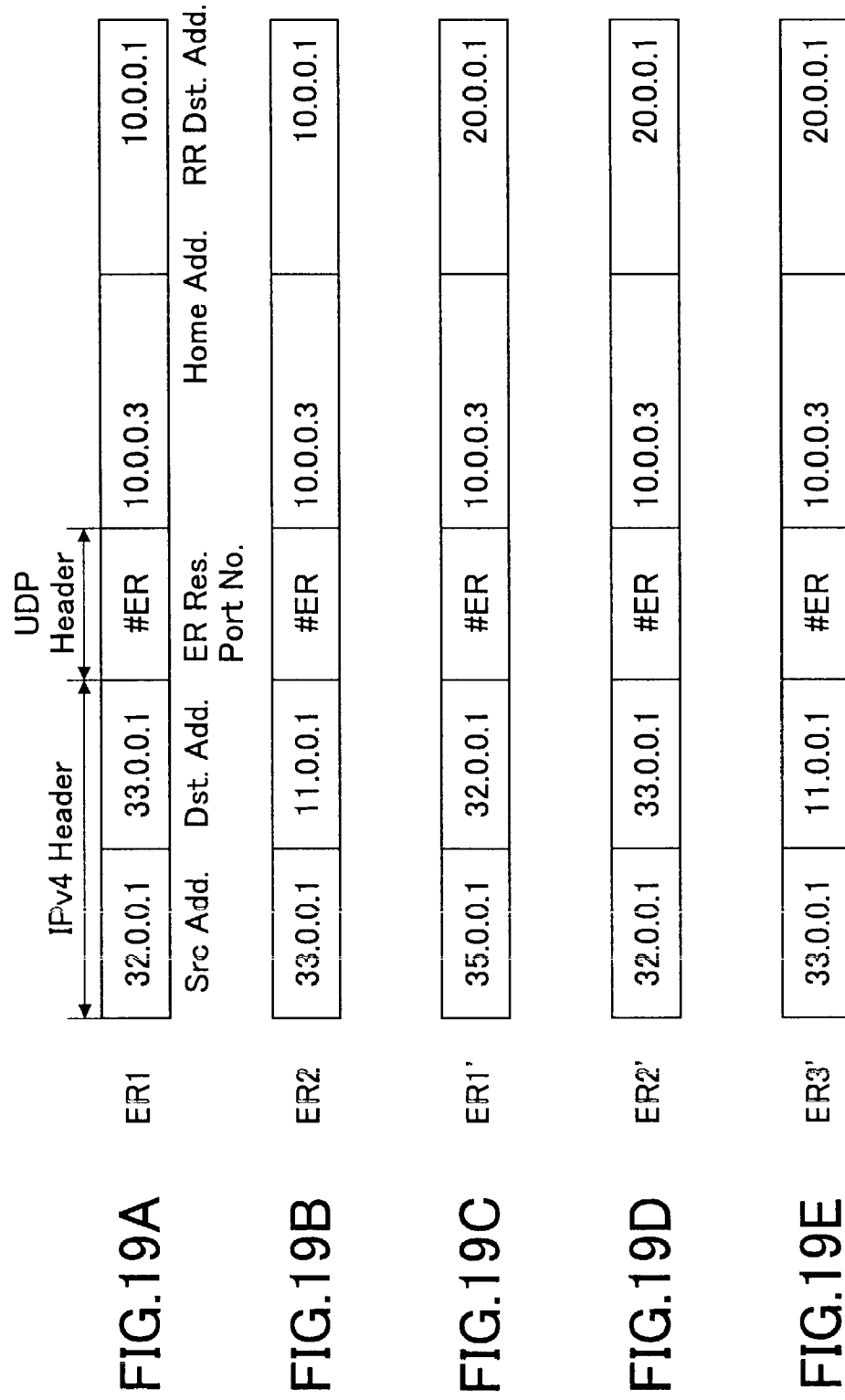

PACKET TRANSMISSION SYSTEM, AND APPARATUS AND METHOD FOR CONTROLLING PACKET TRANSMISSION ROUTE

BACKGROUND OF THE INVENTION

1. Field of the Invention

The present invention relates to a packet transmission system for transmitting data packets to a mobile node, and to an apparatus and method for controlling a packet transmission route to the mobile node in the packet transmission system.

2. Description of the Related Art

FIG. 1 illustrates a conventional packet transmission network 200. The packet transmission network 200 comprises a network 220 having an arbitrary topology consisting of multiple nodes and links connecting the nodes. A router, which is a node existing in the network 220, stores the connection configuration of the node and the links (i.e., the topology) as route information under the routing control protocol, such as OSPF (open shortest path first). The router forwards a packet addressed to the other node exactly toward a direction in which the destination node exists.

The network 220 that routes a packet based on the IPv4 addressing architecture is hereinafter called an IPv4 packet transmission system 220. The conventional IPv4 packet transmission system 220 includes a mobile node (MN) 210 that communicates with other nodes while moving from one link to another link. The system 220 also includes a home agent (HA) 230 that provides a home link 231 to the mobile node 210, and access routers (AR) 240-1 through 240-4 that function as foreign agents and provide foreign links 241-1 through 241-4, respectively, each connectable to the mobile node 210. The mobile node 210 communicates with a counterpart correspondent node (CN) 250 in the system 220.

FIG. 2 illustrates the communication process of the conventional packet transmission network 200. The mobile node (MN) 210 has a home address (e.g., "10.0.0.3" used in the home link 231. If the mobile node 210 has moved into the foreign link 231-1 provided by the access router (AR) 240-1, as illustrated in FIG. 2, the access router 240-1 gives its own address "11.0.0.1", as a c/o address (CoA), to the mobile node 210, which is a foreigner to the access router (or the foreign agent) 240-1 (Process A).

Having received the c/o address (CoA), the mobile node 210 requests the access router (AR) 240-1 to transmit a registration request (RR), which is a transmission route control packet, to the home agent (HA) 230 (Process B). An example of the registration request (RR) is illustrated in FIG. 3A, and the RR contains a data field called binding information in which the home address "10.0.0.3" of the mobile node 210 is recorded in combination with c/o address (CoA) "11.0.0.1".

In response to the request from the mobile node 210, the access router (AR) 240-1 transmits the registration request (RR), informing the home agent (HA) 230 that the mobile node 210 is now located in the foreign link 231-1 and therefore the transmission route to this mobile mode 210 should be changed (Process C).

Having received the registration request (RR) from the access router (AR) 240-1, the home agent (HA) 230 enters the home address "10.0.0.3" and the c/o address (CoA) "11.0.0.1" contained in the registration request (RR) into the cache (Process D).

In this state, if the correspondent node (CN) 250 produces and transmits a packet addressed to the home address "10.0.0.3", this packet is forwarded to the home agent (HA) 230 via the router (not shown) of the IPv4 packet transmission system 220 (Process E). An example of the packet is illustrated in FIG. 3B, which contains the home address "10.0.0.3" as a destination address.

Since the destination address "10.0.0.3" contained in the forwarded packet agrees with the address in the entry, the home agent (HA) 230 receives this packet, in place of the mobile node 210, and produces a packet with the c/o address "11.0.0.1" recorded in the entry as a destination address to forward the packet to the access router (AR) 240-1. The packet transmitted from the correspondent node (CN) 250 is stored in the payload of the newly produced packet, as illustrated in FIG. 3C. The technique for storing a packet in the payload of another packet is called "tunneling", and the packet containing another packet in its payload is called a tunneling packet. The tunneling packet produced by the home agent (HA) 230 is forwarded to the access router (AR) 240-1 via a router (not shown) in the IPv4 packet transmission system 220 (Process F).

When the access router (AR) 240-1, which functions as a foreign agent, receives a tunneling packet addressed to the access router 240-1 itself, the packet is extracted from the payload of the tunneling packet. Then, the access router (AR) 240-1 transmits the extracted packet to the mobile node 210, attaching a link layer header containing the MAC (media access control) address of the mobile node 210 as a destination address (Process G).

By the way, when the mobile node 210 receives a packet addressed to itself at a foreign link 241-1, the mobile mode 210 can transmit a registration request (RR) to the correspondent node (CN) 250, which is the source terminal of the packet, via the access router (AR) 240-1 (Process H).

Upon receiving the registration request (RR), the correspondent node (CN) 250 enters the home address "10.0.0.3" and c/o address "11.0.0.1", which is the address of the access router (AR) 240-1, contained in the registration request (Process I). Then, in order to further transmits a packet to the home address "10.0.0.3" of the mobile node 210, the correspondent node (CN) 250 produces a tunneling packet having the c/o address "11.0.0.1" of the access router (AR) 240-1 as a destination address in the header, and transmits this tunneling packet to the access router (AR) 240-1 (Process J).

Upon receiving the tunneling packet, the access router (AR) 240-1, which functions as a foreign agent, extracts the packet from the payload of the tunneling packet, as in Process G. The access router (AR) 240-1 then attaches a link layer header to the packet, which contains the MAC address of the mobile node 210 as a destination, and transmits this packet to the mobile node 210 (Process K).

The technique of transmitting a tunneling packet from the correspondent node (CN) 250 directly to the access router (AR) 240-1 without passing through the home agent (HA) 230 is called route optimization.

Then, every time the mobile node 210 moves to a new foreign link 241, it acquires a new c/o address (CoA), and transmits the home address and the acquired c/o address to both the home agent (HA) 230 and the correspondent node (CN) via the access router (AR) 240 providing that foreign link 241.

However, the above-described conventional packet transmission system 220 has a drawback in that a packet loss may occur when the mobile node 210 moves between foreign links 241 that are far away from the home agent (HA) 230 or the correspondent node (CN) 250. For example, when the mobile node 210 moves from a remote foreign link 241 to another foreign link 241, the packet transmitted from the home agent (HA) 230 or the correspondent node (CN) 250 is likely to be missed. This is because the packet is forwarded to the access router (AR) 240 of the former foreign link 241 in which the mobile node 210 is previously located before the registration request (RR) transmitted from the access router (AR) 240 of the new foreign link 241 reaches the home agent (HA) 230 or the correspondent node (CN) 250.

SUMMARY OF THE INVENTION

The preset invention was conceived to overcome the above-described problem in the conventional packet transmission system, and it is an object of the present invention to provide a packet transmission system that can reduce undesirable packet loss caused when the mobile node moves between foreign links.

It is another object of the invention to provide an apparatus and method for controlling the packet transmission route in the packet transmission system, which prevents the packet from being lost.

To achieve the objects, in one aspect of the invention, a packet communication system comprises (a) a home agent providing a home link and a home address to a mobile node, (b) one or more access routers, each providing a foreign link and a c/o address to the mobile node when the mobile node has moved into the corresponding foreign link, and (c) one or more mobility support routers that relay a packet to a destination between the mobile node and the home agent or a counterpart correspondent node wherever the mobile node is located. The mobility support router is configured to acquire a first registration request addressed to the home agent and/or the correspondent node when the mobile node has moved into a first foreign link, to store a first entry having the home address of the mobile node and a c/o address contained in the acquired first registration request, and to update the first registration request changing the c/o address to its own address to pass the updated first registration request toward the home agent and/or the counterpart correspondent node.

When the mobility support router acquires a data packet addressed to the mobile node whose home address is contained in the first entry, then the mobility support router encapsulates the data packet to produce a tunneling packet, and transmits the tunneling packet to the c/o address recorded in the first entry in association with the home address.

With this arrangement, the data packet is correctly forwarded to the mobile node via the mobility support router wherever the mobile node is located.

If the mobility support router has acquired a packet that is neither a registration request, nor a data packet addressed to the mobility support router itself, nor a packet with a destination address contained in the first entry, then the mobility support router carries out an ordinary routing operation for the acquired packet.

The mobility support router also acquires a second registration request addressed to the home agent and/or the counterpart correspondent node when the mobile node has moved into a second foreign link. In this case, the mobility support router changing the c/o address recorded in the first entry to a new c/o address contained in the second registration request to update the first entry.

Since the updated c/o address is recorded in the first entry no matter where the mobile node has moved, a data packet addressed to the mobile node is correctly routed to the mobile node.

When the c/o address of the first entry is updated to the new c/o address, the mobility support router may produce and transmit an erasing request addressed to the c/o address previously recorded in the first entry.

The mobility support router also receives an erasing request containing the home address of the mobile node that has moved into the second foreign link. In this case, the mobility support router erases the first entry having that home address, and produces and transmits a new erasing request addressed to the c/o address recorded in the erased first entry in association with the home address.

In another aspect of the invention, a packet transmission route control apparatus used in a packet transmission system is provided. Such a packet transmission system includes a home agent providing a home link and a home address to a mobile node, and one or more access routers, each providing a foreign link and a c/o address to the mobile node when the mobile node has moved into the corresponding foreign link. This packet transmission route control apparatus comprises (a) a packet acquisition unit configured to acquire a first registration request addressed to the home agent and/or a counterpart correspondent node when the mobile node has moved into a first foreign link, (b) a first entry storing unit configured to store a first entry having the home address of the mobile node and a c/o address contained in the acquired first registration request, and (c) a registration request relay unit configured to update the first registration request by changing the c/o address to its own address and to transmit the updated first registration request toward the home agent and/or the counterpart correspondent node.

The packet transmission route control apparatus also comprises (d) a packet transfer unit. When acquiring a data packet addressed to the mobile node whose home address is recorded in the first entry, the packet transfer unit encapsulates the data packet to produce a tunneling packet, and transmits the tunneling packet to the c/o address recorded in the first entry in association with the home address.

If the packet acquisition unit has acquired a packet that is neither a registration request, nor a data packet addressed to the mobility support router itself nor a packet with a destination address contained in the first entry, then the packet transfer unit carries out an ordinary routing operation for an acquired packet.

With this arrangement, the data packet is correctly relayed to the mobile node wherever the mobile node is located.

In still another aspect of the invention, a method for controlling a packet transmission route in a packet transmission system is provided. Such a system includes a home agent providing a home link and a home address to a mobile node, and one or more access routers, each providing a foreign link and a c/o address to the mobile node when the mobile node has moved into the corresponding foreign link. This method comprises:

(a) setting a mobility support router between the home agent and the access router(s);

(b) acquiring, at the mobility support router, a first registration request produced by a first access router and addressed to the home agent and/or a counterpart correspondent node when the mobile node has moved into a first foreign link;

(c) storing a first entry having the home address of the mobile node and the c/o address contained in the acquired first registration request; and (d) updating the first registration request by changing the c/o address to its own address to pass the updated first registration request toward the home agent and/or the counterpart correspondent node.

The method further comprises:

(e) acquiring, at the mobile support node, a data packet addressed to the mobile node and containing the home address of the mobile node;

(f) determining whether, in the mobility support router, there is a first entry having the same home address as that contained in the data packet;

(g) encapsulating the data packet to produce a tunneling packet if there is the first entry that has the same home address as that contained in the data packet; and (h) transmitting the tunneling packet to a c/o address recorded in the first entry in association with the home address contained in the data packet.

With this method, the data packet is correctly delivered to the mobile node, with considerably reduced packet loss, wherever the mobile node is located. The method further comprises:

(i) acquiring a packet at the mobility support router;

(j) determining whether the packet is either a registration request, a data packet addressed to the mobility support router itself, or a packet having a destination address that is contained in the first entry; and (k) carrying out an ordinary routing operation if the packet is neither the registration request, nor the data packet addressed to the mobility support router itself, nor the packet having a destination address contained in the first entry.

BRIEF DESCRIPTION OF THE DRAWINGS

Other objects, features, and advantages of the invention will become more apparent from the following detailed description when read in conjunction with the accompanying drawings, in which FIG. 1 schematically illustrates a conventional packet transmission system;

FIG. 4 illustrates a packet transmission system according to the first embodiment of the invention;

FIGS. 16A through 16D illustrate examples of the transmission route control packet addressed to the home agent (HA) according to the second embodiment of the invention;

FIGS. 17A through 17D illustrate examples of the transmission route control packet addressed to the correspondent node (CN) according to the second embodiment of the invention:

FIG. 18 is a diagram used to explain the transmission route control process carried out by the packet transmission system according to the second embodiment;

FIGS. 19A through 19E illustrate example of the route erasing request packet according to the second embodiment of the invention;

DETAILED DESCRIPTION OF THE PREFERRED EMBODIMENTS

The details of the preferred embodiment of the invention will now be described with reference to the attached drawings.

FIG. 4 illustrates a packet transmission network 100 according to the first embodiment of the invention. The packet transmission network 100 provides a packet transmission system 120, which routes a packet based on the IPv4 addressing architecture. The packet transmission system 120 may be referred to as an IPv4 transmission system.

The packet transmission system 120 includes a mobile node (MN) 110, a home agent (HA) 130 that provides a home link 131 to the mobile node (MN) 110, one or more access routers (AR) 140-1 through 140-4 that provide foreign links 141-1 through 141-4, respectively, and-one or more mobile supporting routers (MSR) 150-1 through 1506.

The mobile node (MN) 110 communicates with another node, for example, with a counterpart correspondent node (CN) 160, while moving from one link to another link. Each of the access routers (AR) 140-1 through 140-4 functions as a foreign agent and provides a foreign link connectable to the mobile node 110.

The mobile supporting routers (MSR) 150-1 through 150-6 are nodes that control a packet transmission route to and from the mobile node (MN) 110. Each mobile supporting router (hereinafter, simply referred to as MSR) 150 successively relays the registration request generated by an access router AR toward the home agent (HA) 130. During the relay, each MSR 150 stores an entry in which the home address of the mobile node (MN) 110 is recorded in combination with the latest c/o address upon which the mobile node (MN) 110 has relied. Then, each MSR 150 produces a new registration request (RR) having an updated c/o address, which is the address of the MSR 150 itself, and transmits this registration request to the home agent (HA) 130.

Figure 1:
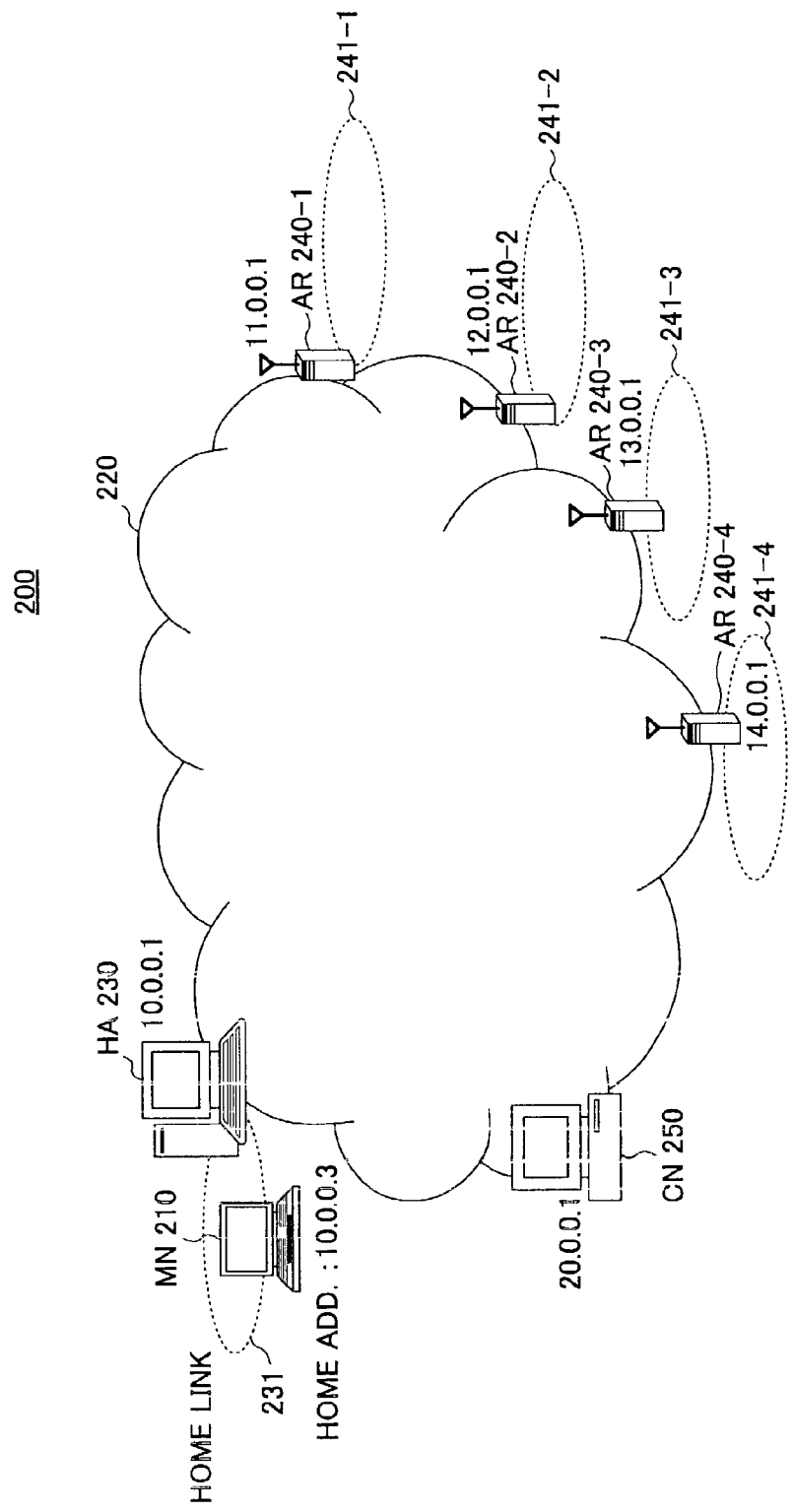
Figure 2:
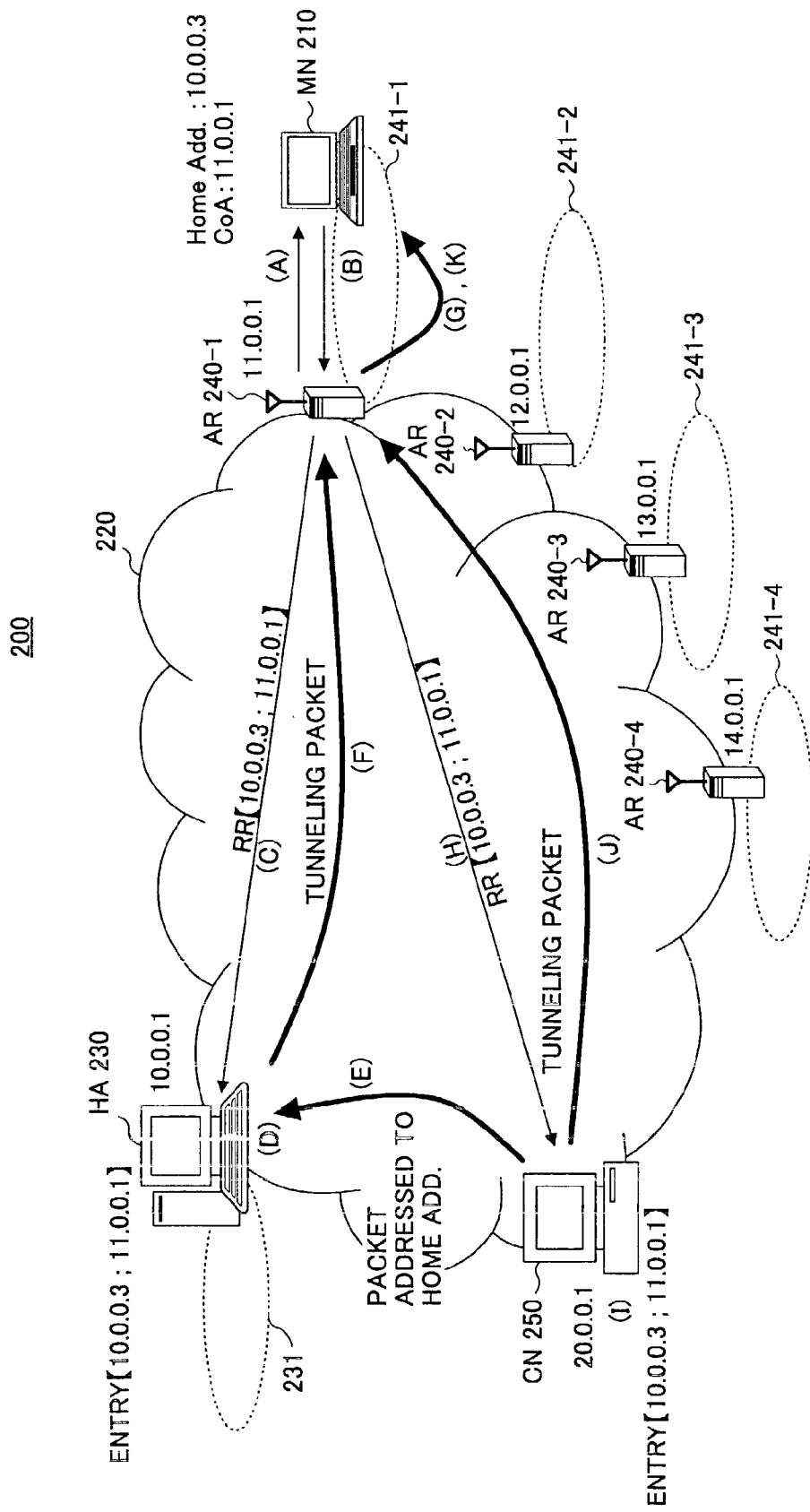
FIG. 2 illustrates a conventional packet transmission process carried out in the conventional system shown in FIG. 1.
Figure 3A:
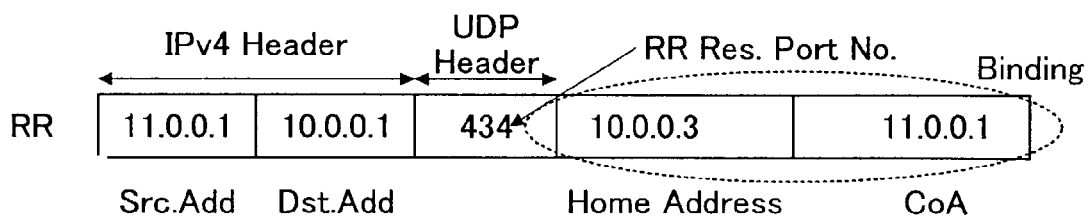
FIG. 3A illustrates an example of the transmission route control packet used in the conventional packet transmission system.
Figure 3B:
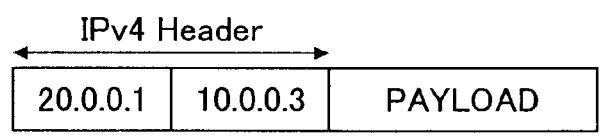
FIG. 3B illustrates an example of the conventional packet addressed to the home address of a mobile node.
Figure 3C:
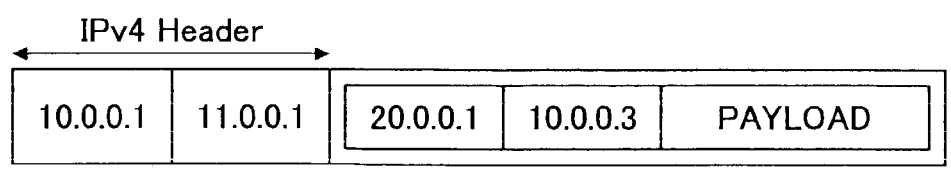
FIG. 3C illustrates an example of the conventional tunneling packet.
Figure 5:
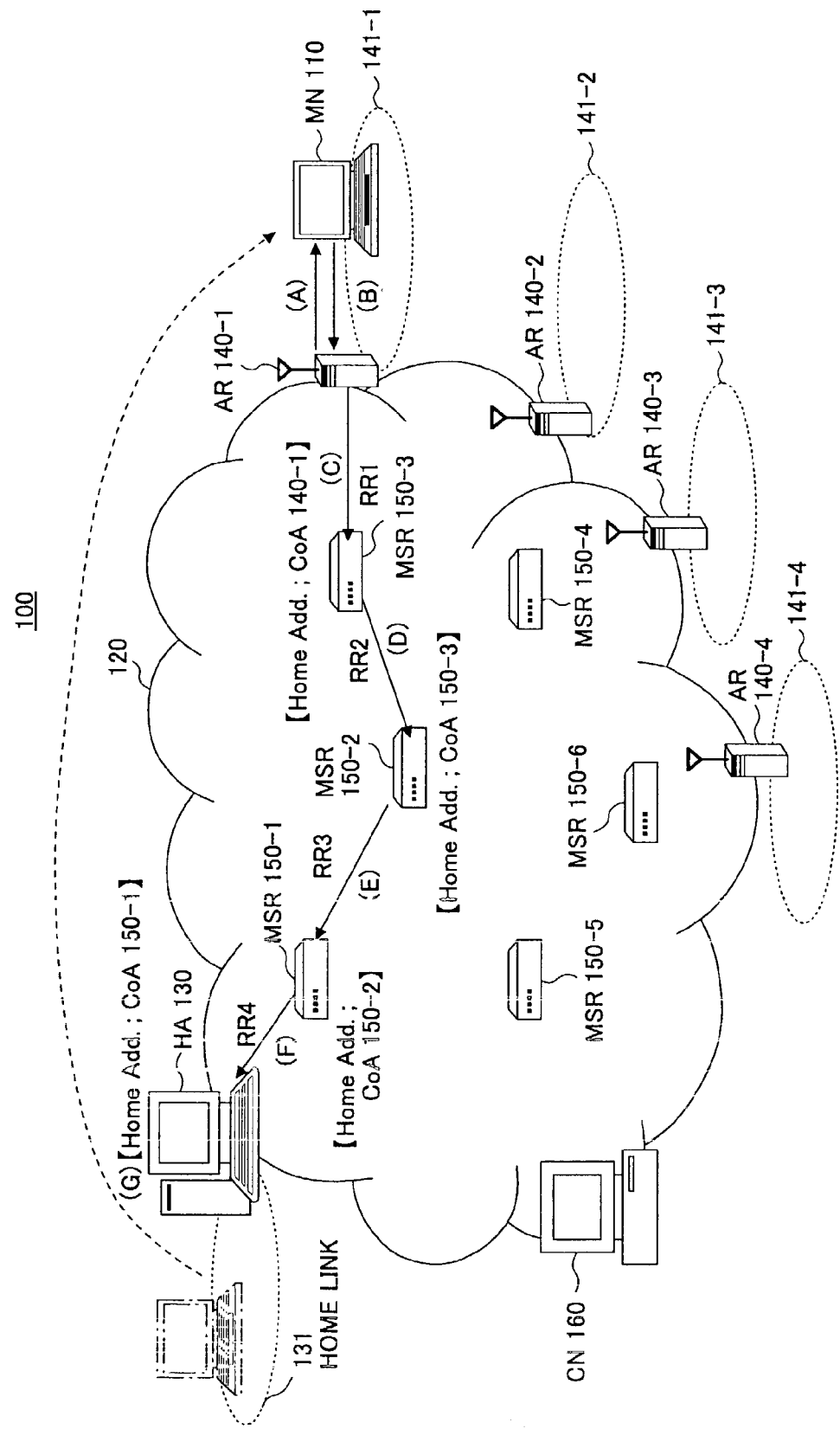
FIG. 5 is a diagram used to explain the packet transmission process carried out by the system shown in FIG. 4.

FIG. 5 illustrates such a packet transmission process carried out by the packet transmission system 120 according to the first embodiment. In this example, the mobile node (MN) 110 has a home address "10.0.0.3" used in the home link 131.

If the mobile node (MN) 110 has left the home link 131 and has moved to a foreign link 141-1 provided by the access router (AR) 140-1, the access router (AR) 140-1 functions as a foreign agent and gives its own address "11.0.0.1" to the mobile node (MN) 110 as a c/o address (Process A).

Having received the c/o address from the access router (AR) 140-1, the mobile node (MN) 110 supplies its home address "10.0.0.3", as well as address "10.0.0.1" of the home agent (HA) 130, to the access router (AR) 140-1, and requests the access router (AR) 140-1 to transmit a registration request (RR) to the home agent (HA) 130 (Process B). A registration request (RR) is a transmission route control packet for reporting that the packet transmission route to the mobile node (MN) 110 is changed because of having moved into a different link.

Upon receiving the request from the mobile node (MN) 110, the access router (AR) 140-1 generates a registration request (RR) and transmits it toward the home agent (HA) 130. The registration request generated by the access router (AR) 140-1 is referred to as RR1. In the example shown in FIG. 5, the registration request (RR1) is received at MSR 150-3 (Process C).

Figure 6:
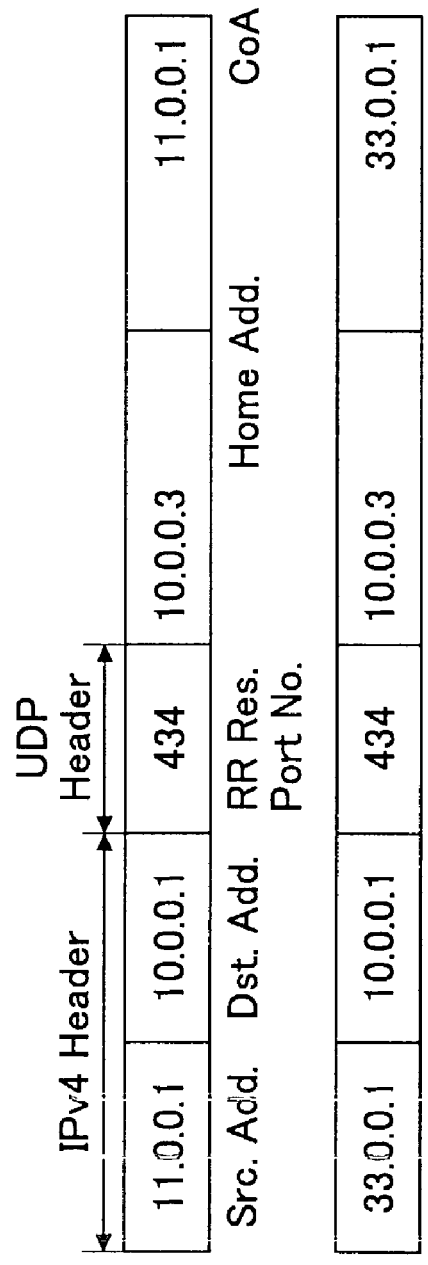
FIGS. 6A through 6D illustrate examples of the transmission route control packet according to the first embodiment.

The structure of RR1 is illustrated in FIG. 6A. RR1 contains binding information in which home address "10.0.0.3" of the mobile node (MN) 110 and c/o address (CoA) "11.0.0.1", which is the address of the access router (AR) 140-1, are combined together. RR1 also includes a source address, which is address "11.0.0.1" of the access router (AR) 140-1 in this case, and a destination address, which is address "10.0.0.1" of the home agent (HA) 130.

Upon receiving RR1 from the access router (AR) 140-1, MSR 150-3 stores an entry describing the home address "10.0.0.3" and c/o address "11.0.0.1" contained in RR1 in its cache (not shown). The entry is indicated by brackets in FIG. 5. At the same time, the expiration time (lifetime) of that entry is reset. Then, the MSR 150-3 produces a new registration request (which is referred to as RR2) by setting the address "33.0.0.1" of the MSR 150-3 itself in the fields of c/o address, as illustrated in FIG. 6B. Thus, c/o address "11.0.0.1" of RR1, which is the address of the access router (AR) 140-1, is changed to the address of the MSR 150-3 itself. Similarly, the source address "11.0.0.1" of the access router (AR) 140-1 is changed to the address "33.0.0.1" of the MSR 150-3 itself. The RR2 is transmitted from the MSR 150-3 (Process D).

RR2 is received at MSR 150-2, and MSR 150-2 carries out the same process as MSR 150-3, namely, storing an entry describing the home address "10.0.0.3",and c/o address "33.0.0.1" contained in RR2 in its cache (not shown). At the same time, the expiration time (i.e., the lifetime) of that entry is reset. Then, the MSR 150-2 produces a new registration request (which is referred to as RR3) by setting its own address (i.e., the self address) "32.0.0.1" in the field of c/o address, as illustrated in FIG. 6C. The newly produced RR3 is then transmitted (Process E).

RR3 is received at MSR 150-1, which carries out the same process as MSR 150-2 and MSR 150-3. An entry with the home address "10.0.0.3" and c/o address "32.0.0.1" contained in RR3 is produced, and this entry is stored in its cache (not shown). At the same time, the expiration time (i.e., the lifetime) of that entry is reset. Then, the MSR 150-1 produces a new registration request (which is referred to as RR4) by setting its own address "31.0.0.1" in the field of c/o address, as illustrated in FIG. 6D. RR4 is transmitted (Process F).

The home agent (HA) 130 receives RR4, and stores an entry having the home address "10.0.0.3" and c/o address "31.0.0.1", which is the address of the latest MSR 150-1, contained in RR4 in its built-in cache (not shown) (Process G).

In this manner, the registration request (RR) transmitted from the access router (AR) 140-1 is relayed by one or more MSRs 150 toward the home agent (HA) 130.

Figure 7:
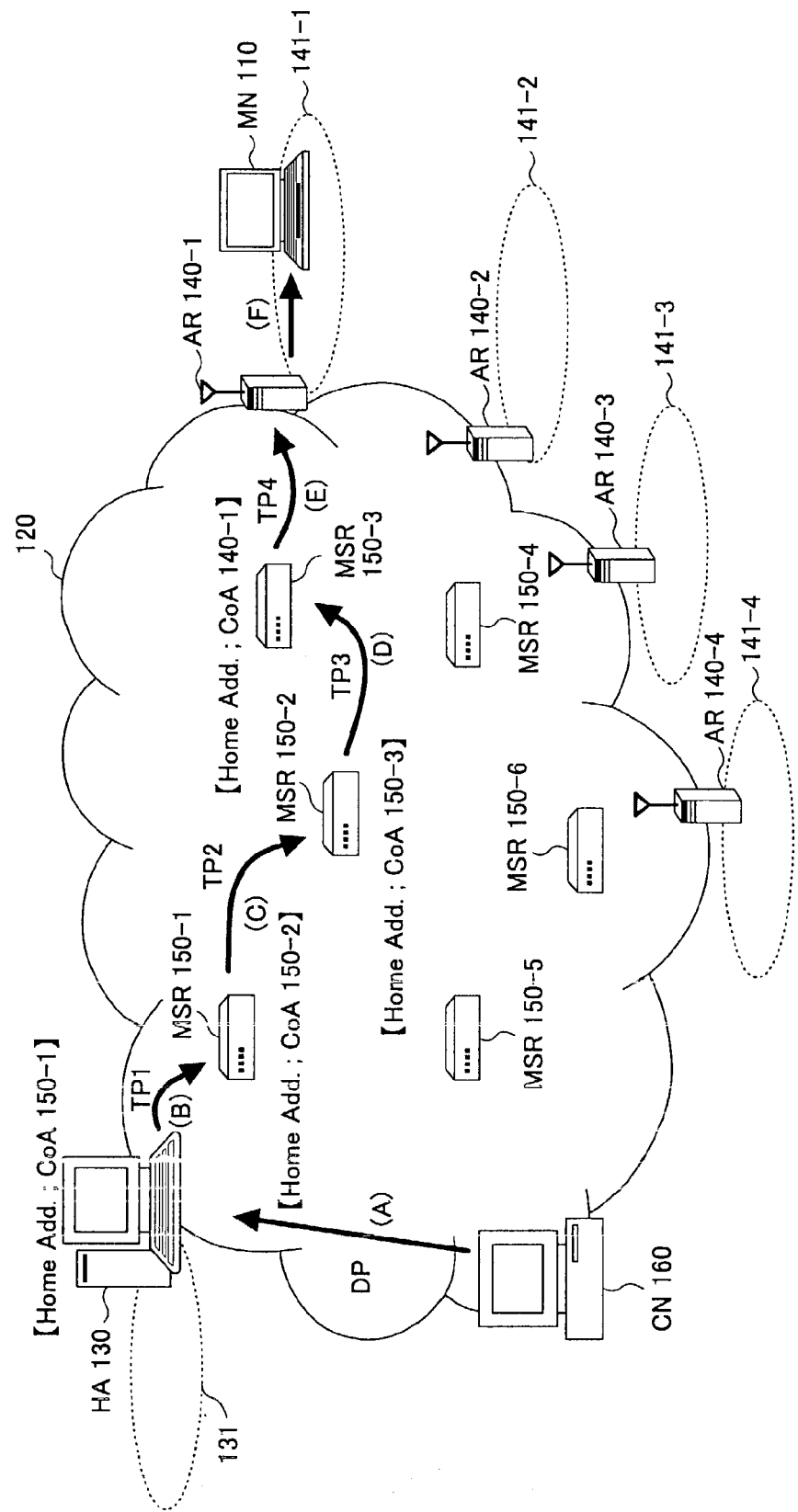
FIG. 7 is a diagram used to explain how the packet produced and transmitted by a counterpart correspondent node (CN) is forwarded to the mobile node (MN) according to the first embodiment.

FIG. 7 illustrates how the packet transmission system 120 transfers a message transmitted from the correspondent node (CN) 160 to the mobile node (MN) 110 that is located in a foreign link 141-1. The home agent (HA) 130 currently stores an entry in which the home address "10.0.0.3" of the mobile node (MN) 110 is associated with the c/o address "31.0.0.1" of the latest node (i.e., MSR 150-1 in this case), which is the node that sent the RR4 to home agent (HA) 130. Similarly, MSR 150-1 has an entry describing the home address "10.0.0.3" of the mobile node (MN) 110 in combination with the c/o address "32.0.0.1" of the latest node (i.e., MSR 150-2). MSR 150-2 has an entry describing the home address "10.0.0.3" of the mobile node (MN) 110 in combination with the c/o address "33.0.0.1" of the latest node (i.e., MSR 150-3), and MSR 150-3 has an entry describing the home address "10.0.0.3" of the mobile node (MN) 110 in combination with the c/o address "11.0.0.1" of the latest node (i.e., the access router 140-1).

Figure 8:
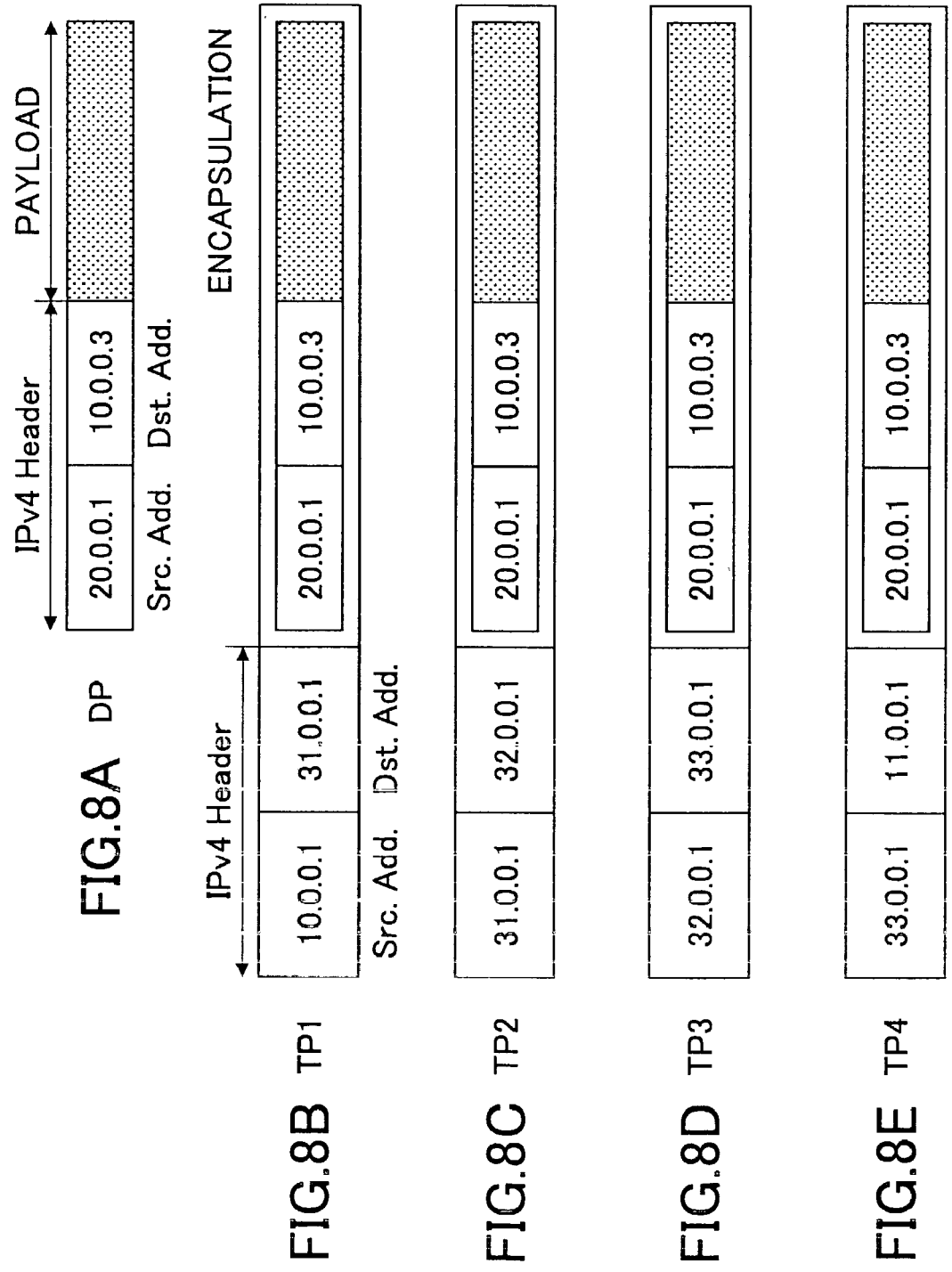
FIG. 8A illustrates an example of a data packet.
FIGS. 8B through 8E illustrate examples of routing packets used in the packet transmission system according to the first embodiment of the invention.

The correspondent node (CN) 160 produces a data packet (DP) addressed to the mobile node (MN) 110. This data packet contains the home address of the mobile node (MN) 110 as the destination address, as illustrated in FIG. 8A. The data packet (DP) is first supplied to the home agent (HA) 130 by an ordinary routing (Process A).

The home agent (HA) 130 receives the data packet and searches in its cache to determine whether there is an entry having the same home address as that contained in the data packet sent from the correspondent node (CN) 160. If the home agent (HA) 130 finds the corresponding entry, it extracts the c/o address "31.0.0.1" of MSR 150-1 that is associated with the home address in the entry. Then, the home agent generates and transmits a tunneling packet 1 (TP1) that has a destination address of "31.0.0.1", which is the the address of MSR 150-1 and recorded as the c/o address in the entry, and an encapsulation in which the data packet (DP) transmitted from the correspondent node (CN) 160 is encapsulated, as illustrated in FIG. 8B (Process B).

MSR 150-1 receives the tunneling packet TP1, and decapsulates the data packet (DP) from the tunneling packet TP1. Then, MSR 150-1 searches in its cache to find the entry that contains the home address of the mobile node (MN) 110, which is the destination address designated in the data packet. If it finds the entry, MSR 150-1 extracts the c/o address "32.0.0.1" of MSR 150-2 from the entry, and produces a tunneling packet 2 (TP2) having a header containing the address "32.0.0.1" of MSR 150-2 as the destination address and an encapsulation in which the data packet DP is encapsulated, as illustrated in FIG. 8C. This tunneling packet TP2 is transmitted to the destination MSR 150-2 (Process C).

Upon receiving the tunneling packet TP2, MSR 150-2 carries out the same operation as MSR 150-1, that is, decapsulating the data packet (DP) from the tunneling packet TP2, searching in its cache to find the entry that has the same home address of the mobile node (MN) 110 as that contained in the data packet, and extracting the c/o address "33.0.0.1" of MSR 150-3 from the entry. Then, MSR 150-2 produces a tunneling packet 3 (TP3) having a header containing the address "33.0.0.1" of MSR 150-3 as the destination address and an encapsulation in which the data packet DP is encapsulated, as illustrated in FIG. 8D. This tunneling packet TP3 is transmitted to the destination MSR 150-3 (Process D).

Upon receiving the tunneling packet TP3, MSR 150-3 decapsulates the data packet (DP) from the tunneling packet TP3, searches in its cache to find the entry that contains the home address of the mobile node (MN) 110, and extracts the c/o address "11.0.0.1" of the access router (AR) 140-1 from the entry. Then, MSR 150-3 produces a tunneling packet 4 (TP4) having a header containing the address "11.0.0.1" of AR 140-1 as the destination address and an encapsulation in which the data packet DP is encapsulated, as illustrated in FIG. 8E. This tunneling packet TP4 is transmitted to the destination AR 140-1 (Process E).

Upon receiving the tunneling packet TP4, the access router (AR) 140-1 transmits the data packet DP encapsulated in TP4 to the mobile node (MN) 110 that is currently located in the foreign link 141-1 controlled by this access router 140-1. The mobile node (MN) 110 receives this message at foreign link 141-1 (Process F).

In this manner, each MSR encapsulates the data packet transmitted from the correspondent node (CN) 160 and relays this data packet to the destination, that is, the mobile node (MN) 110.

Figure 9:
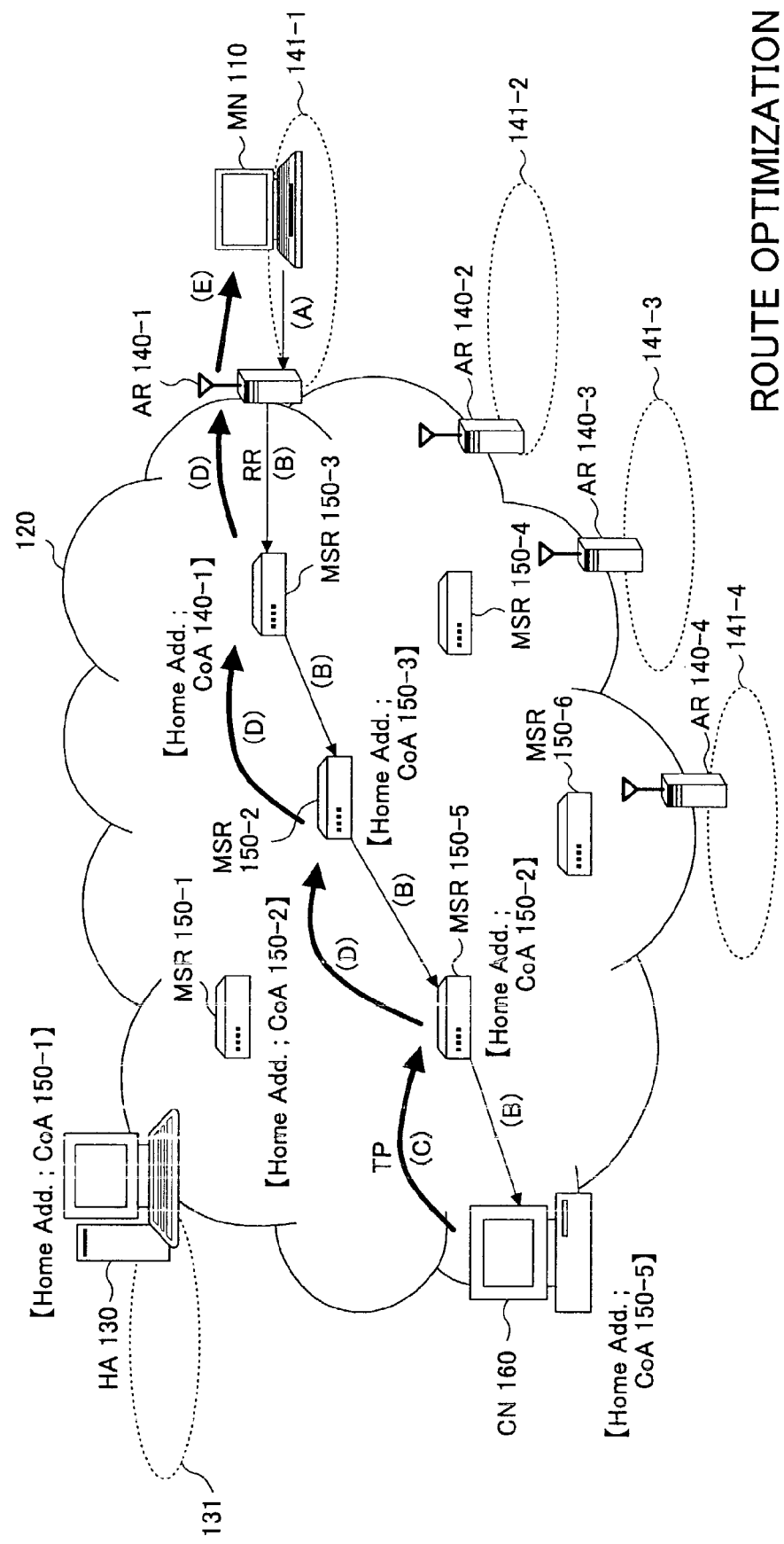
FIG. 9 illustrates a route optimization process carried out by the packet transmission system according to the first embodiment of the invention.

FIG. 9 illustrates how the packet transmission system 120 carries out route optimization, in which data packet are transmitted between the mobile node (MN) 110 and the correspondent node (CN) 160 without passing through the home agent (HA) 130. Having received the data packet from the correspondent node (CN) 160 via the foreign agent (that is, the access router) 140-1, the mobile node (MN) 110 requests the access router (AR) 140-1 to transmit a registration request (RR) to the correspondent node (CN) 160. Upon receiving the request, the access router (AR) 140-1 produces a registration request that contains the home address "10.0.0.3" of the mobile node (MN) 110 and c/o address "11.0.0.1", which is the self address of the access router (AR) 140-1 (Process A).

MSRs 150-3, 150-2, and 150-5 successively relay the registration request (RR), while updating the c/o address contained in the RR to its own addresses. Each MSR stores an entry containing the home address of the mobile node (MN) 110 and the latest c/o address contained in the RR before updating the c/o address.

For example, when MSR 150-2 receives the RR from MSR 150-3, it stores an entry recording the home address "10.0.0.3" of the mobile node (MN) 110 in combination with the c/o address "33.0.0.1" of MSR 150-3 in its cache (not shown), and resets the expiration time (or the lifetime) of that entry. Then, MSR150-2 updates c/o address from "33.0.0.1" to its own address "32.0.0.1" to produce a new registration request (RR). The new registration request is transmitted. The same process is carried out at each MSR to relay the registration request to the correspondent node (CN) 160 (Process B).

Upon receiving the registration request (RR), the correspondent node (CN) 160 stores an entry describing the home address "10.0.0.3" and c/o address "35.0.0.1" contained in the registration request in its cache (not shown). In the subsequent process, the correspondent node (CN) 160 produces and transmits a tunneling packet (TP) encapsulating the data packet (DP) and having the address "35.0.0.1" of the latest MSR 150-5 as the destination (Process C).

Each MSR conducts the same process as processes C-E described in conjunction with FIG. 7, that is, decapsulating the data packet (DP) from the received tunneling packet, and searching in its cache using the home address contained in the data packet as a key to find the corresponding c/o address. For example, MSR 150-2 decapsulates the data packet from the tunneling packet transmitted by MSR 150-5, and searches for the c/o address "33.0.0.1" of MSR 150-3. Then, MSR 150-2 produces and transmits a tunneling packet that encapsulates the data packet and has the retrieved c/o address "33.0.0.1" as the destination (Process D).

The data packet is relayed-to the access router (AR) 140-1. Upon receiving the tunneling packet from the latest MSR 150-3, the access router (AR) 140-1 transmits this tunneling packet or the data packet contained in the tunneling packet to the mobile node (MN) 110 located in the foreign link 141-1 controlled by the access router (AR) 140-1. The mobile mode (MN) 110 finally receives the data packet originated from the correspondent node (CN) 160 (Process E).

In this manner, if the correspondent node(CN) 160 receives a registration request from the mobile node (MN) 110, an entry containing the home address "10.0.0.3" of the mobile node (MN) 110 in combination with the address "35.0.0.1" of the latest MSR 150-5 as the c/o address is generated and stored in the correspondent node (CN) 160. For the subsequent communication, a tunneling packet that contains a data packet addressed to the home address of the mobile node 110 and has a destination address "35.0.0.1" for this tunneling packet is generated. This tunneling packet is forwarded directly to the mobile node (MN) 110 without being routed through the home agent (HA) 130.

By the way, during the ordinary routing to the home agent (HA) 130 shown in FIG. 7, the data packet transmitted from the correspondent node (CN) 160 may happen to pass through an MSR 150 that has the entry with the home address contained in that data packet, before it reaches the home agent (HA) 130. In this case, the packet transmission system 120 carries out the bypassing operation shown in FIG. 10.

Figure 10:
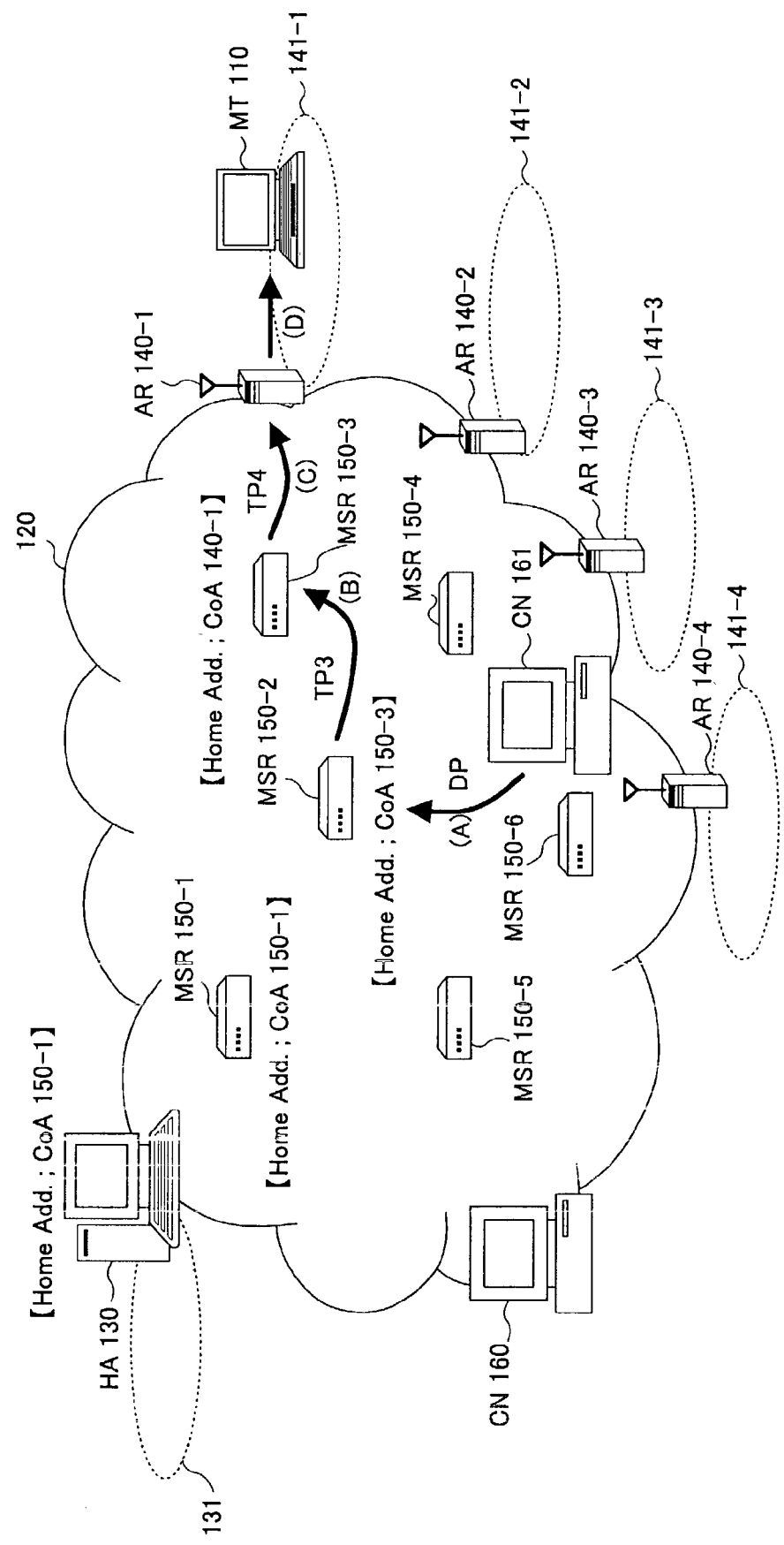
FIG. 10 illustrates a situation in which a packet transmitted from a correspondent node (CN) passes through a mobile supporting router (MSR) that has the home address of the mobile node in its entry before the packet reaches the home agent (HA)

In FIG. 10, a correspondent node (CN) 161 transmits a data packet (DP) addressed to the mobile node (MN) 110 (Process A). This data packet passes MSR 150-2 on the way to the home agent (HA) 130. MSR 150-2 acquires the data packet, and searches in its cache using the home address contained in the data packet as a key. When MSR 150-2 finds the corresponding c/o address "33.0.0.1" of MSR 150-3 associated with this home address, MSR 150-2 produces a tunneling packet (TP3) that encapsulates this data packet. MSR 150-2 also sets the retrieved c/o address "33.0.0.1" into the destination address of this tunneling packet TP3, and transmits the tunneling packet TP3 (Process B).

Upon receiving TP3, MSR 150-3 decapsulates the data packet (DP) from TP3, and searches in the entry using the home address contained in the data packet as a key. When MSR 150-3 finds the c/o address "11.0.0.1" of the access router (AR) 140-1 associated with the home address, a tunneling packet TP4 (shown in FIG. 8E) encapsulating the data packet with "11.0.0.1" as the destination address is produced and transmitted (Process C).

Upon receiving TP4, the access router (AR) 140-1, which functions as a foreign agent of the IPv4 network 100, transmits the tunneling packet or the data packet (DP) contained in this tunneling packet to the mobile node (MN) 110 currently located in the foreign link 141-1 of AR 140-1 (Process D).

In this manner, when an MSR 150 happens to acquire a data packet transmitted from the correspondent node (CN) 160 and whose destination address is recorded in its cache, the MSR 150 encapsulates this data packet in a tunneling packet, and forwards the tunneling packet toward the mobile node (MN) 110 bypassing the home agent (HA) 130.

Figure 11:
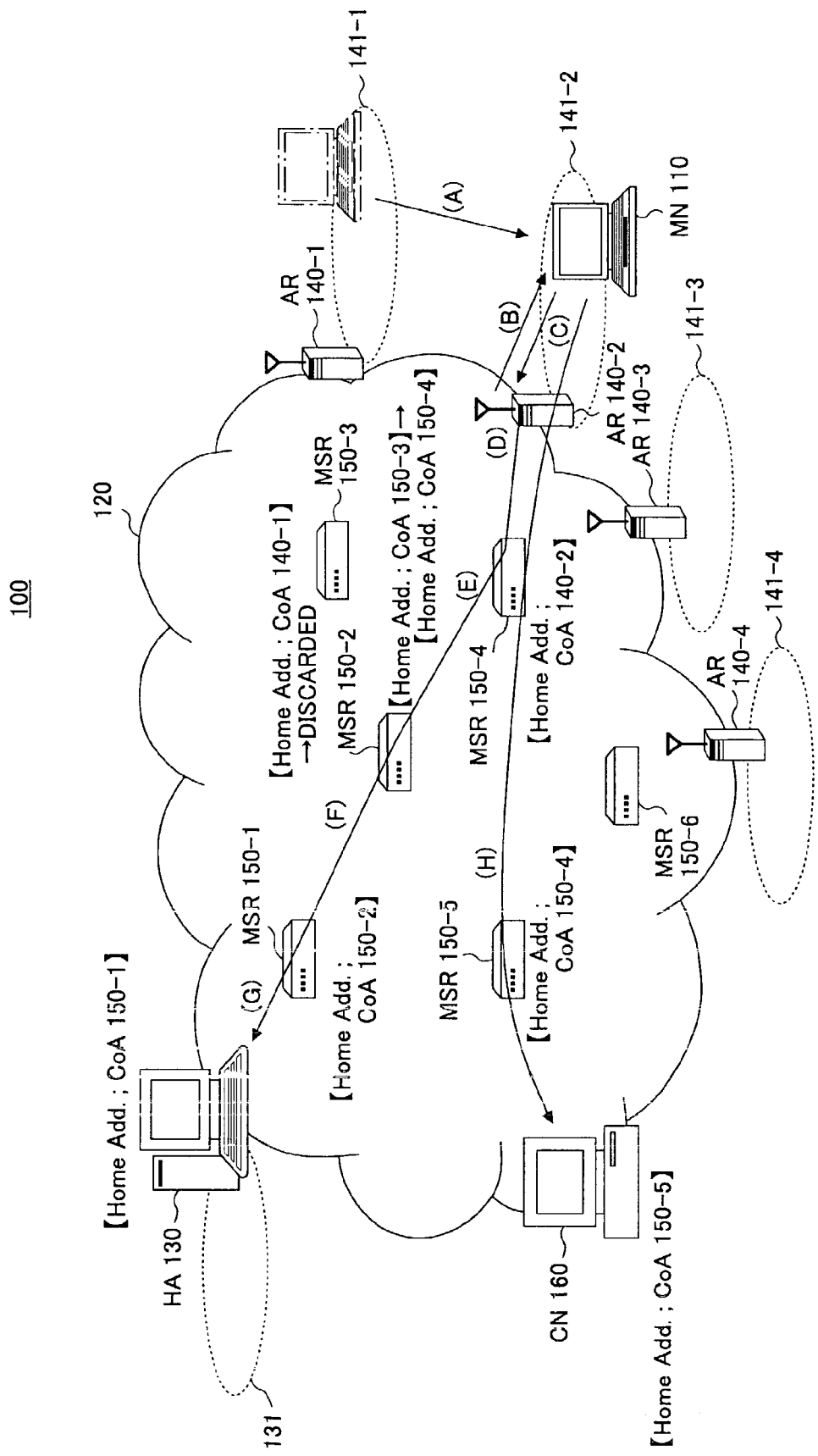
FIG. 11 illustrates the transmission route control process carried out in the packet transmission system when the mobile node moves from a foreign link to another foreign link according to the first embodiment.

FIG. 11 illustrates how the packet transmission system 120 operates when the mobile node (MN) 110 moves between foreign links 141. In the example shown in FIG. 11, the mobile node (MN) 110 has left the foreign link 141-1 provided by the access router (AR) 140-1 and has moved to another foreign link 141-2 provided by the access router (AR) 140-2 (Process A).

The access router (AR) 140-2, which functions as a foreign agent for the mobile node (MN) 110, gives the self address "12.0.0.1" as a c/o address to the mobile node (MN) 110 (Process B).

Upon receiving the c/o address, the mobile node (MN) 110 requests the access router (AR) 140-2 to transmit a registration request (RR) to the home agent (HA) 130 (process C).

The access router (AR) 140-2 generates a registration request that contains the home address "10.0.0.3" of the mobile node (MN) 110 and the c/o address "12.0.0.1", and transmits this registration request toward the home agent (HA) 130 (Process D).

The registration request (RR) is relayed by MSRs 150-4, 150-2, and 150-1 to the home agent (HA) 130, as has been described above. To be more precise, MSR 150-4 stores an entry describing the home address "10.0.0.3" of the mobile station and the c/o address "12.0.0.1" contained in the registration request in its cache (not shown). At the same time, the expiration time of this entry is reset. Then, MSR 150-4 updates the c/o address, setting its own address "34.0.0.1" in place of the latest c/o address "12.0.0.1", to produce a new registration request RR. The new registration request is transmitted from MSR 150-4 (Process E).

MSR 150-2 receives the registration request (RR) from MSR 150-4, and starts searching in its cache for the entry having the home address "10.0.0.3". When finding the entry, MSR 150-2 compares the c/o address "33.0.0.1" recorded in the entry with the c/o address "34.0.0.1" contained in the registration request transmitted from MSR 150-4. In this example, these c/o addresses differ from each other, and therefore, MSR 150-2 updates the entry by changing the c/o address from "33.0.0.1", which is the address of MSR 150-3, to "34.0.0.1". At the same time, the expiration time of this entry is reset.

As an alternative, the c/o address of the entry having the target home address may be automatically updated without comparison with the c/o address contained in the currently received registration request (RR). The expiration time of the updated entry is reset.

Then, MSR 150-2 produces a new registration request, setting its own address "32.0.0.1", in place of "34.0.0.1", as the c/o address. The source address is also changed from "34.0.0.1" to the self address "32.0.0.1". This registration request is transmitted (process F).

MSR 150-1 receives the registration request transmitted from MSR 150-2, and searches the target entry using the home address "10.0.0.3" contained in the registration request as a key. When finding the target entry, MSR 150-1 compares the c/o address "32.0.0.1" recorded in the entry in association with the home address of the mobile node 110 with the c/o address "32.0.0.1" contained in the registration request. In this case, these two addresses agree with each other, and therefore, MSR 150-1 resets the expiration time (i.e., the lifetime) of the entry without updating the c/o address of the entry.

As an alternative, MSR 150-1 may automatically update the c/o address of the entry that has the home address contained in the currently received registration request, without carrying out a comparison with the c/o address in the registration request. In this case, the entry is updated and the expiration time (lifetime) of the entry is reset, but there is no change in the contents of the entry. Then, MSR 150-1 produces a new registration request, setting its own address "31.0.0.1" as the c/o address and the source address in the registration request. The registration request transmitted from MSR 150-1 is finally received at the home agent (HA) 130 (Process G).

The access router (AR) 140-2 also produces and transmits a registration request addressed to the correspondent node (CN) 160 which is in communication with the mobile node (MN) 110. This registration request is relayed by MSRs 150-4 and 150-5 toward the correspondent node (CN) 160 (Process H). The operation carried out by each MSR (150-4 or 150-5) is the same as that explained above, namely, storing an entry having the home address "10.0.0.3" of the mobile node (MN) 110 and the c/o address from the latest node (MSR or AR), resetting the expiration time (i.e., the lifetime) of the entry, producing a new registration request (RR) by setting its own address as the c/o address and the source address, and transmitting the new registration request.

In the example shown in FIG. 11, the registration request (RR) transmitted form the access router (AR) 140-2 toward the home agent (HA) 130 does not pass through MSR 150-3. Consequently, MSR 150-3 discards the entry stored in process D shown in FIG. 5 when the entry expires.

Figure 12:
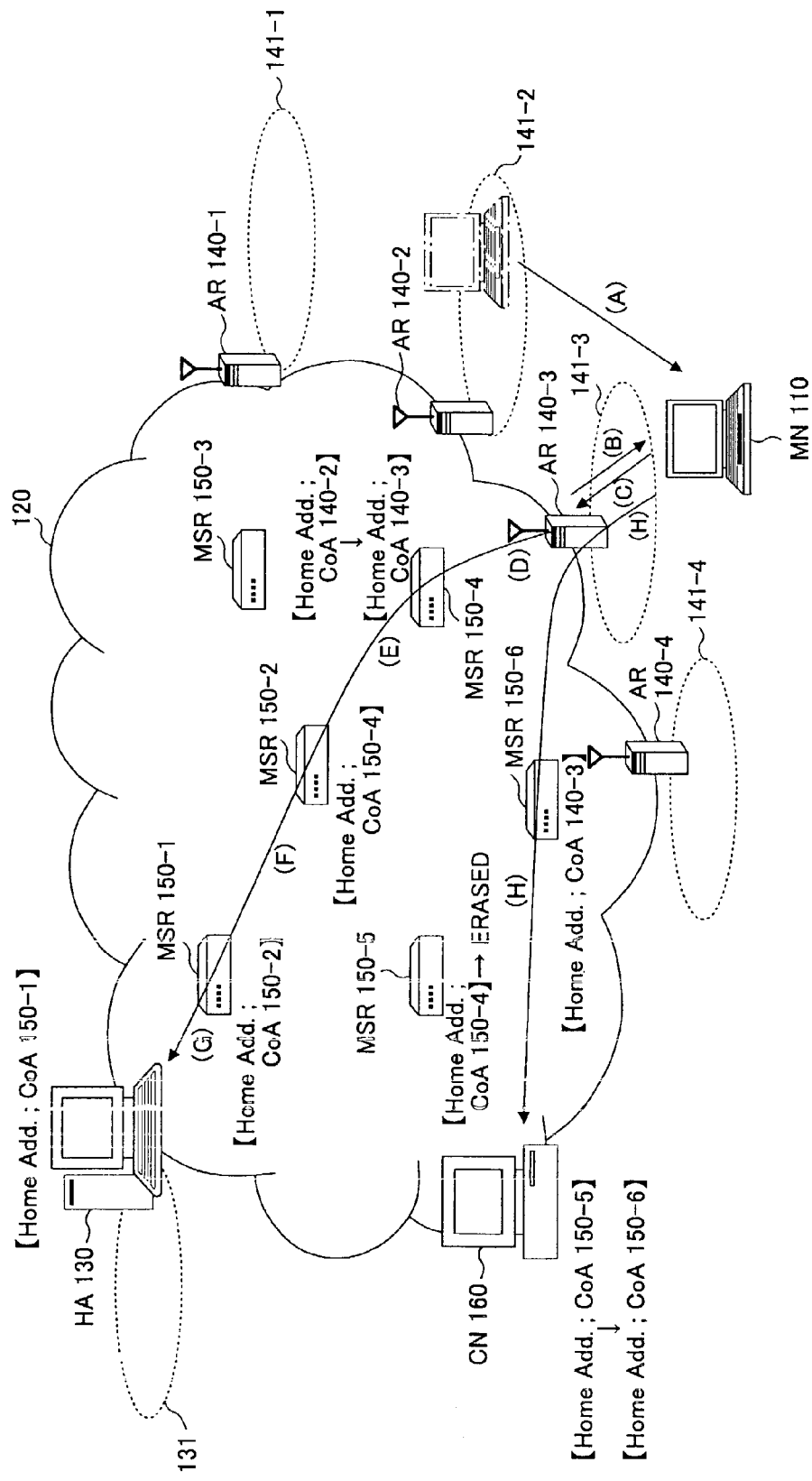
FIG. 12 illustrates how the transmission route is controlled when the mobile node further moves to still another foreign link.

FIG. 12 illustrates how the packet transmission system 120 operates when the mobile node (MN) 110 moves from the foreign link 141-2 to still another foreign link 141-3 provided by the access router (AR) 140-3 (Process A).

The access router (AR) 140-3, which functions as a foreign agent for the mobile node (MN) 110, gives the self address "13.0.0.1" as a c/o address to the mobile node (MN) 110 (Process B).

Upon receiving the c/o address, the mobile node (MN) 110 requests the access router (AR) 140-3 to transmit a registration request (RR) to the home agent (HA) 130 (process C).

The access router (AR) 140-3 generates a registration request that contains the home address "10.0.0.3" of the mobile node (MN) 110 and the c/o address "13.0.0.1", and transmits this registration request toward the home agent (HA) 130 (Process D).

The registration request (RR) is relayed by MSRs 150-4, 150-2, and 150-1 to the home agent (HA) 130. MSR 150-4 receives the registration request (RR) from the access router (AR) 140-3, and starts searching in its cache for the entry having the home address "10.0.0.3". When finding the entry, MSR 150-4 compares the c/o address "12.0.0.1" recorded in the entry with the c/o address "13.0.0.1" contained in the registration request transmitted from the access router (AR) 140-3. In this example, these c/o addresses differ from each other, and therefore, MSR 150-4 updates the entry by changing the c/o address from "12.0.0.1", which is the address of the access router (AR) 140-2, to "13.0.0.1", which is the address of the new access router (AR) 140-3. At the same time, the expiration time (i.e., the lifetime) of this entry is reset.

As an alternative, the c/o address of the entry that has the target home address may be automatically updated without comparison with the c/o address contained in the currently received registration request (RR). The expiration time (i.e., the lifetime) of the updated entry is also reset.

Then, MSR 150-4 produces a new registration request, setting its own address "34.0.0.1", in place of "13.0.0.1", as the c/o address. The source address is also changed from "13.0.0.1" to the self address "34.0.0.1". This registration request is transmitted (process E).

MSR 150-2 receives the registration request transmitted from MSR 150-4, and searches for a target entry using the home address "10.0.0.3" contained in the registration request as a key. When finding the target entry, MSR 150-2 compares the c/o address "34.0.0.1", which is recorded in the entry in association with the home address of the mobile node 110, with the c/o address "34.0.0.1" contained in the registration request. In this case, these two addresses agree with each other, and therefore, MSR 150-2 resets the expiration time (lifetime) of the entry without updating the c/o address of the entry.

As an alternative, MSR 150-2 may automatically update the c/o address of the entry that has the home address contained in the currently received registration request, without carrying out a comparison with the c/o address in the registration request. In this case, the entry is updated, but there is no change in the contents of the entry. Then, MSR 150-2 produces a new registration request, setting its own address "32.0.0.1" as the c/o address and the source address in the registration request. The registration request is transmitted (Process F).

The registration request transmitted by MSR 150-2 is received by MSR 150-1, which carries out the same operation as MSR 150-2, and the registration request transmitted by MSR 150-1 is finally received at the home agent (HA) 130 (Process G).

The access router (AR) 140-3 also produces and transmits a registration request addressed to the correspondent node (CN) 160 which is currently communicating with the mobile node (MN) 110. This registration request is relayed by MSR 150-6 toward the correspondent node (CN) 160. MSR 150-6 stores an entry having the home address "10.0.0.3" of the mobile node (MN) 110, in combination with the c/o address "13.0.0.1" of the access router (AR) 140-3, in its cache (not shown). At the same time, expiration time (i.e., the lifetime) of this entry is reset. Then, MSR 150-6 produces a new registration request (RR), by setting its own address "36.0.0.1" as the c/o address and the source address, in place of the former address "13.0.0.1" of the access router (AR) 140-3. This registration request is transmitted to the correspondent node (CN) 160 (Process H).

In the example shown in FIG. 12, the registration request (RR) transmitted from the access router (AR) 140-3 toward the home agent (HA) 130 does not pass through MSR 150-5. Consequently, MSR 150-5 discards the entry stored in process H shown in FIG. 11 when the entry expires (or the lifetime counts up).

Figure 13:
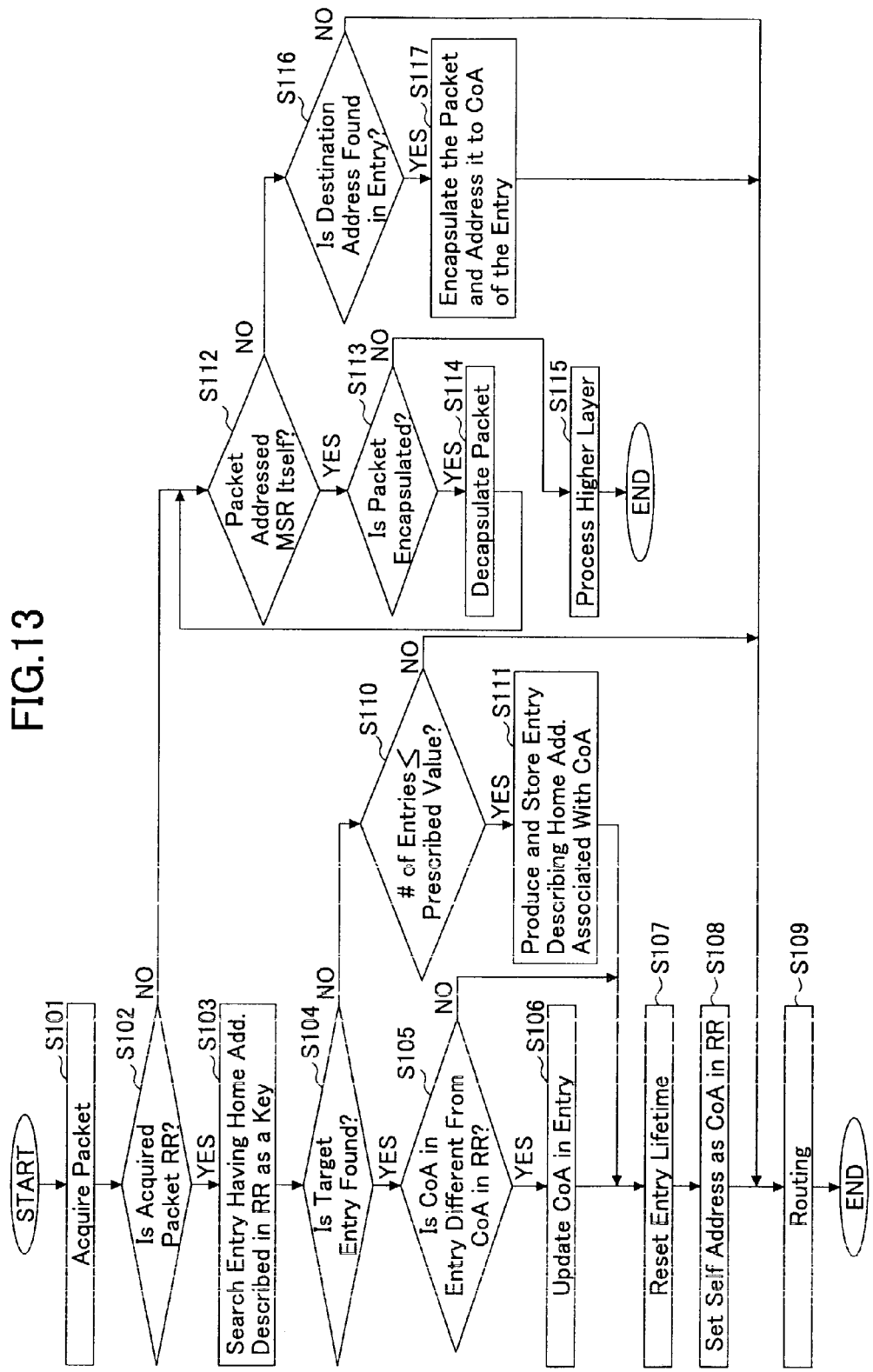
FIG. 13 is a flowchart showing the operation of the mobile supporting router (MSR) according to the first embodiment of the invention.

FIG. 13 illustrates the operation flow carried by an MSR 150 used in the first embodiment. Upon acquiring a packet (S101), the MSR 150 determines whether or not the packet is a registration request (RR) (S102). If the acquired packet is a registration request (YES in S102), MSR150 searches for a target entry using the home address contained in the registration request (RR) as a key (S103), and determines whether or not there is a target entry (S104).

If there is a target entry that has the home address contained in the registration request (YES in S104), it is further determined whether the c/o address of the entry is different from the c/o address contained in the registration request (S105). If the c/o address of the entry differs from the c/o address in the acquired registration request (YES in S105), MSR 150 updates the c/o address of the entry so as to be in agreement with the c/o address contained in the registration request (S106). Then, the expiration time (i.e., the lifetime) of the entry is reset (S107).

On the other hand, if the c/o address of the entry agrees with the c/o address contained in the registration request (NO in S105), the process jumps to step S107, in which the expiration time (i.e., the lifetime) of the entry is simply reset.

Next, MSR 150 sets its own address (i.e., the self address) as the c/o address of the registration request to produce a new registration request (S108). Then, routing is carried out to transmit this new registration request (S109).

If in step S104 there is no entry that has the home address contained in the acquired registration request (NO in S104), it is determined whether the number of entries stored in MSR 150 is equal to or less than a prescribed number (S110). If the number of the stored entries does not exceed the prescribed number (YES in S110), a new entry that describes the home address and the c/o address contained in the registration request is produced and stored (S111). If the number of the stored entries exceeds the prescribed number (NO in S110), the registration request is transmitted to the destination as it is based on the ordinary routing operation.

Then, the steps S107 through S109 are carried out. Namely, the expiration time (lifetime) of the entry is reset (S107), the self address is set as the c/o address to produce a new registration request (S108), and this registration request is transmitted under the routing operation (S109).

If in step S102 the acquired packet is not a registration request (NO in S102), MSR 150 determines whether the acquired packet is addressed to MSR 150 itself (S112). If the packet is addressed to MSR 150 itself (YES in S112), then it is determined whether the packet is encapsulated (S113). If the packet is not encapsulated (No in S113), higher layer processing is carried out (S115). If the packet is encapsulated (YES in S113), MSR150 decapsulates the packet to extract the data packet encapsulated in the acquired packet (S114). Then, the process returns to step S112.

If the acquired packet is not addressed to MSR 150 itself (NO in S112), it is further determined whether the destination address of the acquired packet is found in the entries (S116). If the destination address is found in an entry (YES in S116), the acquired packet is encapsulated to produce a new tunneling packet using the c/o address recorded in this entry as the destination address of the tunneling packet (S117). The tunneling packet is then forwarded to the destination (that is, the c/o address recorded in the entry) by the routing operation (S109). If there is no entry having the destination address of the packet (NO in S116), MSR 150 carries out the routing operation for the acquired packet as it is (S109).

In the operation flow shown in FIG. 13, comparison is made in step S105, and if the c/o address of the entry agrees with the c/o address contained in the packet (i.e., the registration request), the c/o address of the entry is not updated. However, the c/o address of the entry may be automatically updated whenever the target entry is found, regardless of the consistency between the c/o address of the entry and that contained in the packet.

Figure 14:
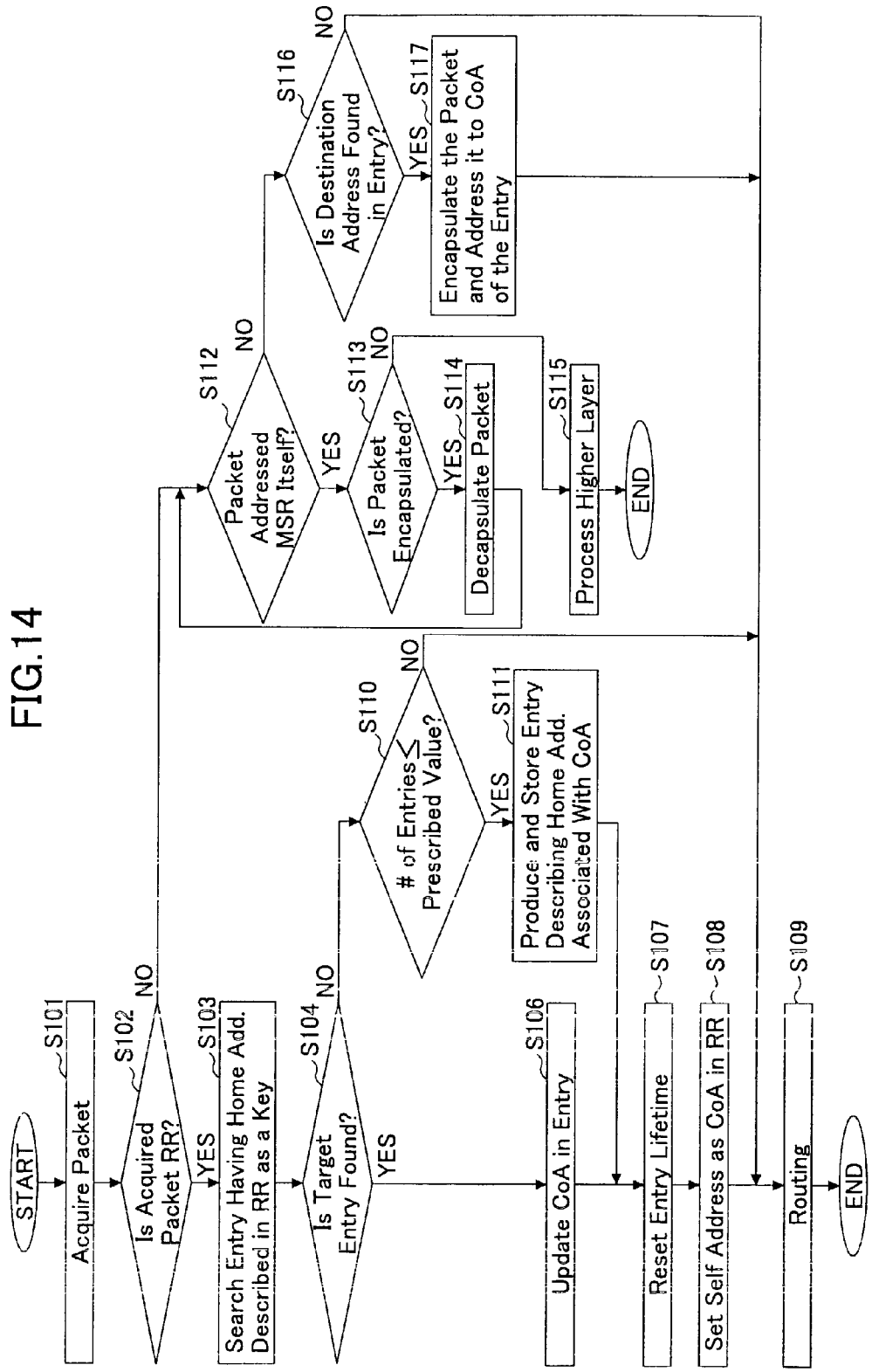
FIG. 14 illustrates another example of the operation flow of the MSR according to the first embodiment of the invention.

FIG. 14 illustrates the operation flow, from which the above-described comparison is omitted. If an entry having the home address contained in the registration request is found (YES in S104), the c/o address of that entry is updated to the c/o address contained in the registration request (S106), and the expiration time (i.e., the lifetime) of this entry is reset (S107). If the c/o address of the entry is the same as that in the registration request, the contents of the entry do not change even after updating. However, updating operation is carried out as a routine.

Figure 15:
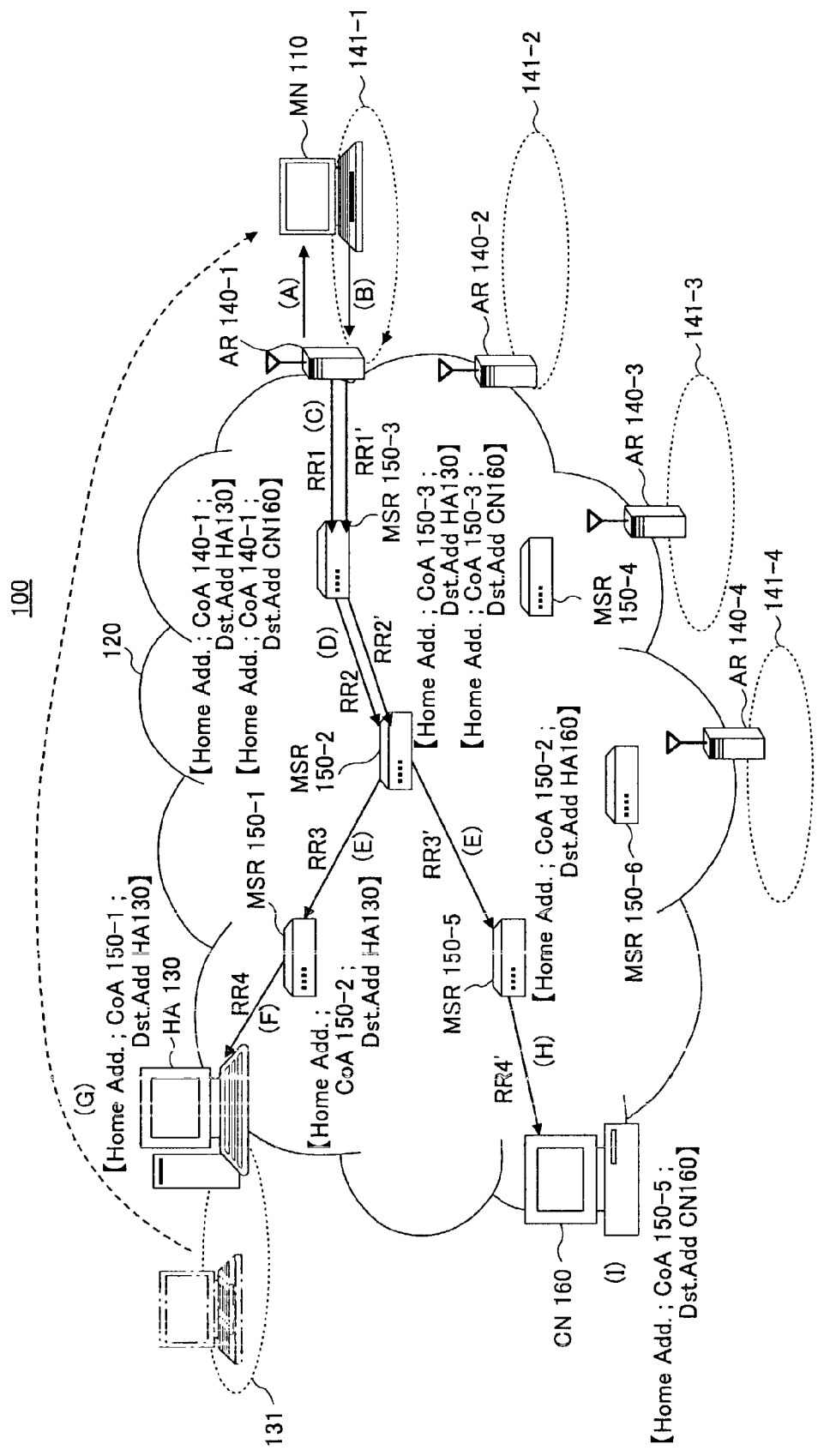
FIG. 15 is a diagram used to explain the transmission route control process carried out in the packet transmission system according to the second embodiment of the invention.

FIG. 15 schematically illustrates a packet transmission system according to the second embodiment. In the second embodiment, each MSR 150 stores an entry that describes the home address in association with the c/o address and the destination address contained in a received transmission route control packet (i.e., a registration request RR). Furthermore, MSR 150 produces a route erasing request during relaying the registration request to the destination.

The operation of the packet transmission system according to the second embodiment will now be explained. A mobile node (MN) 110 has a home address "10.0.0.3" used in the home link 131 provided by the home agent (HA) 130.

When the mobile node (MN) 110 left the home link 131 and has moved to a foreign link 141-1 provided by the access router (AR) 140-1, the access router (AR) 140-1, which functions as a foreign agent, gives the self address "11.0.0.1", as a c/o address, to the mobile node (MN) 110 (Process A).

Having received the c/o address from the access router (AR) 140-1, the mobile node (MN) 110 supplies its home address "10.0.0.3", as well as address "10.0.0.1" of the home agent (HA) 130 and address "20.0.0.1" of the correspondent node (CN) 160, to the access router (AR) 140-1, requesting the access router (AR) 140-1 to transmit a registration request (RR) to the home agent (HA) 130 and the correspondent node (CN) 160 (Process B).

A registration request (RR) is a transmission route control packet for reporting that the packet transmission route to the mobile node (MN) 110 should be changed because of having moved into a different link.

Upon receiving the request from the mobile node (MN) 110, the access router (AR) 140-1 generates a first registration request (RR1) addressed to the home agent (HA) 130 and a second registration request (RR1') addressed to the correspondent node (CN) 160, and transmits these registration requests (Process C).

RR1 addressed to the home agent (HA) 130 is illustrated in FIG. 16A, and RR1' addressed to the correspondent node (CN) 160 is illustrated in FIG. 17A. RR1 has binding information in which the home address "10.0.0.3" of the mobile node (MN) 110 is combined with c/a address (CoA) "11.0.0.1", which is the address of the access router (AR) 140-1. RR1 also includes a source address, which is the address "11.0.0.1" of the access router (AR) 140-1, and a destination address "10.0.0.1" of the home agent (HA) 130. Similarly, RR1' has binding information in which the home address "10.0.0.3" of the mobile node (MN) 110 and the c/a address (CoA) "11.0.0.1" originated from the access router (AR) 140-1 are combined together. RR1 also includes a source address, which is the address "11.0.0.1", of the access router (AR) 140-1 and a destination address "20.0.0.1" of the correspondent node (CN) 160.

Upon receiving RR1 and RR1' from the access router (AR) 140-1, MSR 150-3 stores entries 1 and 1' from the received registration requests RR1 and RR1', respectively. Entry 1 describes the home address "10.0.0.3", the c/o address "11.0.0.1", and the destination address "10.0.0.1" (i.e., the address of the home agent (HA) 130) contained in RR1. Entry 1' described the home address "10.0.0.3", the c/o address "11.0.0.1", and the destination address "20.0.0.1" (i.e., the address of the correspondent node (CN) 160) contained in RR2. These entries are indicated by bracket in FIG. 15. MSR 150-3 stores these entries in its cache (not shown), and resets the expiration time (or the lifetime) of these entries.

MSR 150-3 then produces new registration requests RR2 and RR2', as illustrated in FIGS. 16B and 17B, respectively. In RR2, the self address "33.0.0.1" of MSR 150-3 is set as the c/o address and the source address, in place of address "11.0.0.1" of the latest node (i.e., the access router 140-1) contained in RR1. Similarly, MSR 150-3 also sets the self address "33.0.0.1" as the c/o address and the source address of RR2', in place of "11.0.0.1" contained in RR1'. These new registration requests RR2 and RR2' are transmitted (Process D).

RR2 and RR2' are received at MSR 150-2, and MSR 150-2 carries out the same process as MSR 150-3. MSR 150-2 produces an entry 2 describing the home address "10.0.0.3", the c/o address "33.0.0.1", and the destination address "10.0.0.1" of the home agent (HA) 130 contained in RR2, and an entry 2' describing the home address "10.0.0.3", the c/o address "33.0.0.1", and the destination address "20.0.0.1" of the correspondent node (CN) 160 contained in RR2'. MSR 150-2 stores these entries in its cache (not shown), and resets the expiration time (i.e., the lifetime) of the entries.

Then, MSR 150-2 produces new registration requests RR3 and RR3', as illustrated in FIGS. 16C and 17C, respectively. In RR3, the self address "32.0.0.1" of MSR 150-2 is set as the c/o address and the source address, in place of address "33.0.0.1" of MSR 150-3) contained in RR2. Similarly, MSR 150-2 sets its own address "32.0.0.1" as the c/o address and the source address of RR2', in place of "33.0.0.1" contained in RR2'. These new registration requests RR3 and RR3' are transmitted (Process E).

RR3 is received at MSR 150-1, which produces an entry having the home address "10.0.0.1", the c/o address "32.0.0.1", and the destination address "10.0.0.3" of the home agent (HA) 130, based on the received registration request RR3, and stores the entry in its cache (not shown). At the same time, the expiration time (i.e., the lifetime) of that entry is reset. Then, the MSR 150-1 produces a new registration request RR4 by setting its own address "31.0.0.1" in the fields of c/o address and source address, in place of the latest address "32.0.0.1" of MSR 150-2, as illustrated in FIG. 16D. RR4 is transmitted (Process F).

The home agent (HA) 130 receives RR4, and stores an entry having the home address "10.0.0.3", c/o address "31.0.0.1", and the destination address "10.0.0.1", which is the address of the home agent (HA) 130 itself, in its built-in cache (not shown) (Process G).

On the other hand, RR3' is received at MSR 150-5, which produces an entry having the home address "10.0.0.3", the c/o address "32.0.0.1", and the destination address "20.0.0.3" of the correspondent node (CA) 160 based on the received registration request RR3', and stores the entry in its cache (not shown). At the same time, the expiration time (i.e., the lifetime) of that entry is reset. Then, the MSR 150-5 produces a new registration request RR4' by setting its own address "35.0.0.1" in the fields of c/o address and source address, in place of the latest address "32.0.0.1" of MSR 150-2, as illustrated in FIG. 17D. RR4' is transmitted (Process H).

The correspondent node (CN) 160 receives RR4', and stores an entry having the home address "10.0.0.3", c/o address "35.0.0.1", and the destination address "20.0.0.1", which is the address of the correspondent node (CN) 160 itself, in its built-in cache (not shown) (Process I).

FIG. 18 illustrates how the packet transmission system 120 operates when the mobile node (MN) 110 moves between foreign links 141 in the second embodiment. The mobile node (MN) 110 has left the foreign link 141-1 provided by the access router (AR) 140-1 and has moved to another foreign link 141-2 provided by the access router (AE) 140-2 (Process A).

The access router (AR) 140-2, which functions as a foreign agent for the mobile node (MN) 110, gives the self address "12.0.0.1" as a c/o address to the mobile node (MN) 110 (Process B).

Upon receiving the c/o address, the mobile node (MN) 110 requests the access router (AR) 140-2 to transmit registration requests (RR) to the home agent (HA) 130 and the correspondent node (CN) 160, while supplying the home address "10.0.0.3" of the mobile node (MN) 110, the address "10.0.0.1" of the home agent (HA) 130, and the address "20.0.0.1" of the correspondent node (CN) 160 (process C).

The access router (AR) 140-2 generates a first registration request RR1 addressed to the home agent (HA) 130 and a second registration request RR1' addressed to the correspondent node (CN) 160, and transmits these registration requests (Process D).

Each registration request is relayed to the destination via MSRs 150. To be more precise, in the example shown in FIG. 18, registration requests RR1 and RR1' transmitted by the access router (AR) 140-2 are received at MSR 150-4. MSR 150-4 produces an entry 1 describing the home address "10.0.0.3" of the mobile station, the c/o address "12.0.0.1" of the latest node AR140-2, and the destination address "10.0.0.1" of the home agent (HA) 130 from RR1, and an entry 1' describing the home address "10.0.0.3", c/o address "12.0.0.1" of AR 140-2, and the destination address "20.0.0.1" of the correspondent node (CN) 160 from RR1'. These entries are indicated by brackets in FIG. 18. MSR 150-4 stores the first and second entries in its cache (not shown), and resets the expiration time (or the lifetime) of these entries.

Then, MSR 150-4 produces new registration requests RR2 and RR2' by setting its own address "34.0.0.1" as the c/o address and the source address, in place of "12.0.0.1" of the latest node AR 140-2. The new registration requests RR2 and RR2' are transmitted from MSR 150-4 (Process E).

MSR 150-2 receives the registration request RR2 from MSR 150-4, and starts searching for a target entry in its cache using the home address "10.0.0.3" of the mobile node (MN) 110 and the destination address "10.0.0.1" of the home agent (HA) 130 contained in RR2, as key addresses. When finding the target entry having the home address "10.0.0.3" and the destination address "10.0.0.1", MSR 150-2 compares the c/o address "33.0.0.1", recorded in that entry with the c/o address "34.0.0.1" contained in RR2 transmitted from MSR 150-4. In this example, these c/o addresses differ from each other, and therefore, MSR 150-2 updates the c/o address of the entry from "33.0.0.1", which is the address of MSR 150-3, to "34.0.0.1", which is the address of the latest node MSR 150-4. At the same time, the expiration time (i.e., the lifetime) of this entry is reset (Process F).

Then, MSR 150-2 produces a new registration request RR3, setting its own address "32.0.0.1", in place of "34.0.0.2", as the c/o address. The source address is also changed from "34.0.0.1" to the self address "32.0.0.1". This registration request is transmitted (process G).

MSR 150-1 receives the registration request RR3 transmitted from MSR 150-2, and searches its cache for a target entry using the home address "10.0.0.3" and the destination address "10.0.0.1" contained in RR3 as key addresses. When finding the target entry, MSR 150-1 compares the c/o address "32.0.0.1" recorded in the target with the c/o address "32.0.0.1" contained in RR3. In this case, these two addresses agree with each other, and therefore, MSR150-1 resets the expiration time (i.e., the lifetime) of the entry without updating the c/o address of the entry.

Then, MSR 150-1 produces a new registration request RR4, setting its own address "31.0.0.1" as the c/o address and the source address in the registration request, in place of "32.0.0.1" of RR3. The registration request RR4 is transmitted from MSR 150-1 to the home agent (HA) 130.

Returning to MSR 150-2, upon receiving a registration request RR2 from MSR 150-4, MSR 150-2 produces a route erasing request ER1 when finding the target entry. The structure of the route erasing request ER1 is illustrated in FIG. 19A. ER1 contains the home address "10.0.0.3" of the mobile node (MN) 110 and the destination address "10.0.0.1" of the home agent (HA) 130 contained in RR2. ER1 also contains address "33.0.0.1" of MSR150-3 as its destination address, which is the latest c/o address recorded in the target entry immediately before the updating. This route erasing request ER1 is transmitted to MSR 150-3 (Process H).

Upon receiving ER1, MSR 150-3 searches its cache for a target entry using the home address "10.0.0.3" and the destination address "10.0.0.1" contained in ER1. When finding the target entry that has the home address "10.0.0.3" and the destination address "10.0.0.1", which is associated with the c/o address "11.0.0.1" of the access router (AR) 140-1, MSR 150-3 erases the target entry (Process I).

It should be noted that even if MSR 150-3 does not receive a route erasing request, the entry is erased when the entry expires (or the lifetime counts up).

Then, MSR 150-3 produces a new erasing request ER 2 addressed to the access router (AR) 140-1. Accordingly, ER2 has a destination address set to the c/o address "11.0.0.1" of the access router (AR) 140-1 contained in the erased entry, as illustrated in FIG. 19B. MSR 150-3 also sets its own address "33.0.0.1" as the source address of ER2. The new erasing request ER2 is transmitted to the access router (AR) 140-1 (Process J).

In this manner, the packet transmission route is changed from a route extending from the home agent (HA) 130 via MSRs 150-1, 150-2, and 150-3 to the access router (AR) 140-1 to a route extending from the home agent (HA) 130 via MSR 150-1, 150-2, and 150-4 to the access router (AR) 140-2.

Returning to MSR 150-4 again, the counterpart registration request RR2' produced by and transmitted from MSR 150-4 is received at MSR 150-5. MSR 150-5 searches its cache for a target entry using the home address "10.0.0.3" of the mobile node (MN) 110 and the destination address "20.0.0.1" of the correspondent node (CN) 160 as key addresses. When finding the target entry that has the home address "10.0.0.3" and the destination address "20.0.0.1" contained in RR2', MSR 150-5 compares the c/o address "32.0.0.1" recorded in the target entry with the c/o address "34.0.0.1" contained in RR2'. Since these c/o addresses differ from each other, MSR 150-5 updates the c/o address of the entry to "34.0.0.1" contained in the acquired RR2. At the same time, the expiration time (i.e., the lifetime) of the updated entry is reset (Process K).

Then, MSR 150-5 produces a new registration request RR3' by setting its own address "35.0.0.1" as the c/o address and the source address, in place of "34.0.0.1" of MSR 150-4. This registration request RR3' is transmitted to the correspondent node (CN) 160 (Process L).

MSR 150-5 also produces a route erasing request ER1' that contains the home address "10.0.0.3" and the destination address "20.0.0.1" of CN 160 contained in the acquired RR3', as illustrated in FIG. 19C. The erasing request ER1' has a destination address "32.0.0.1" of MSR 150-2, which is the latest c/o address contained in the entry immediately before the updating. The erasing request ER1' is transmitted to MSR 150-2 (Process M).

Upon receiving ER1' from MSR 150-5, MSR 150-2 searches for a target entry in its cache using the home address "10.0.0.3" and the destination address "20.0.0.1" of CN 160 originally contained in RR3' as key addresses. When finding the target entry that has the home address "10.0.0.3" and the destination address "20.0.0.1" contained in ER1', MSR 150-2 erases this target entry. (Process N).

The erased target entry has the c/o address "33.0.0.1", which is the address of MSR 150-3, in association with the home address and the destination address. It should be noted that even if the erasing request ER1' is not received at MSR 150-2, this entry is erased when the entry expires.

Then, MSR 150-2 produces a new erasing request ER2' addressed to MSR150-3, as illustrated in FIG. 19D. The erasing request ER2' has a destination address "33.0.0.1", which is the address of MSR 150-3 and is contained as the c/o address in the erased entry. MSR 150-2 also sets its own address "32.0.0.1" as the source address of ER2'. The erasing request ER2'is transmitted to MSR 150-3 (Process O).

Upon receiving ER2' from MSR 150-2, MSR 150-3 searches for a target entry in its cache using the home address "10.0.0.3"and the destination address "20.0.0.1" of CN 160 originally contained in RR3' as key addresses. When finding the target entry that has the home address "10.0.0.3" and the destination address "20.0.0.1" contained in ER2', MSR 150-3 erases this target entry. (Process P).

The erased target entry has the c/o address "11.0.0.1", which is the address of the access router (AR), in association with the home address and the destination address. It should be noted that even if the erasing request ER1' is not received at MSR 150-2, this entry is erased when the entry expires.

Then, MSR 150-3 produces a new erasing request ER3' addressed to the access router (AR) 140-1, as illustrated in FIG. 19E. The erasing request ER3' has a destination address "11.0.0.1", which is the address of the access router (AR) 140-1 and is contained as the c/o address in the erased entry. MSR 150-3 also sets its own address "33.0.0.1" as the source address of ER3'. The erasing request ER3' is transmitted to the access router (AR) 140-1 (Process Q).

In this manner, a packet transmission route extending from the correspondent node (CN) 160 via MSRs 150-5, 150-2 and 150-3 to the access router (AR) 140-1 is changed to a route extending from the correspondent node (CN) 160 via MSRs 150-5 and 150-4 to the access router (AR) 140-2.

Figure 20:
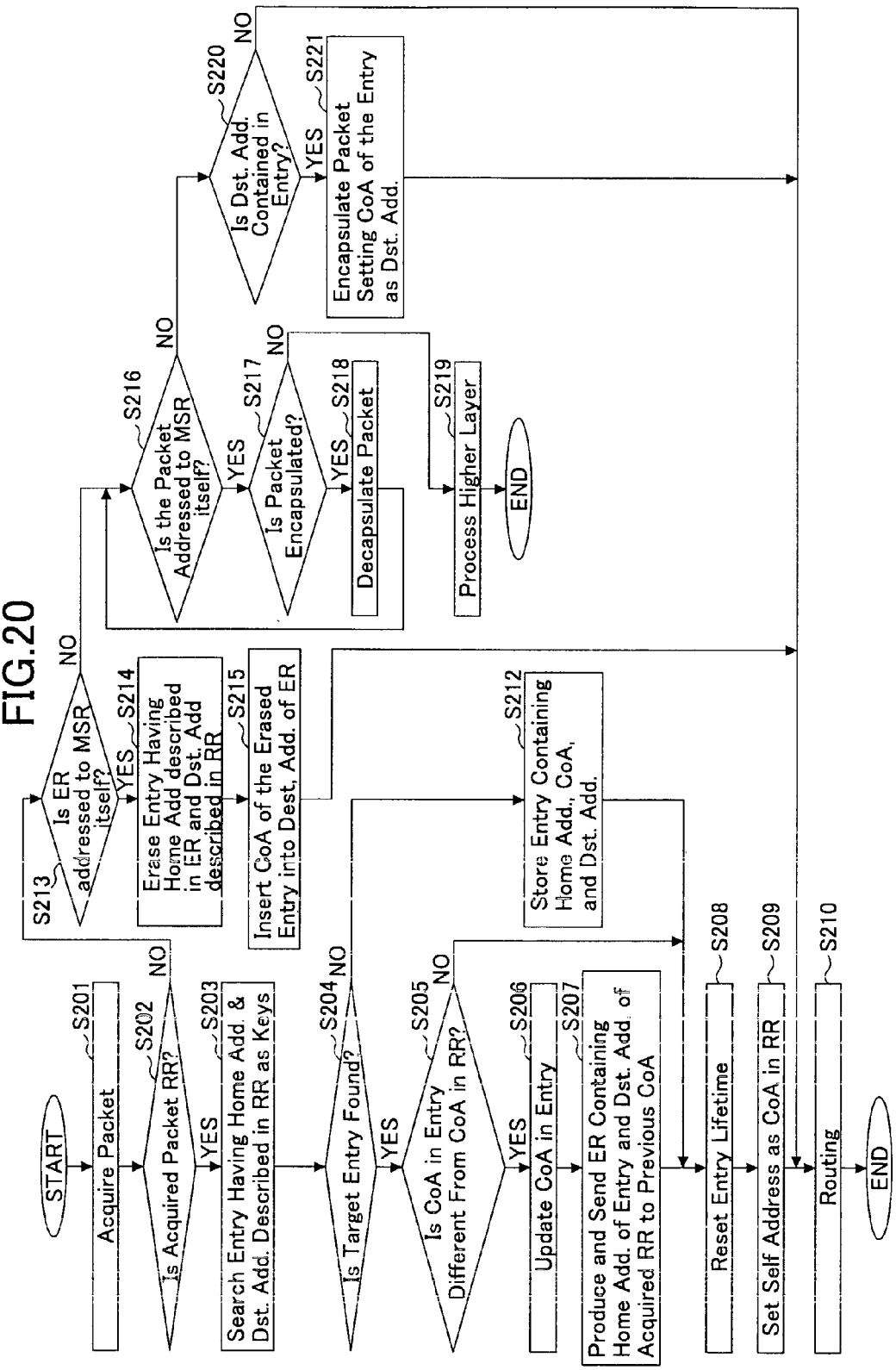
FIG. 20 is a flowchart showing the operation of the mobile supporting router (MSR) according to the second embodiment.

FIG. 20 illustrates the operation flow carried out by an MSR-150 used in the second embodiment. Upon acquiring a packet (S201), the MSR 150 determines whether or not the packet is a registration request (RR) (S202). If the acquired packet is a registration request (YES in S202), MSR 150 searches its cache for a target entry using the home address and the destination address contained in the registration request (RR) as key addresses (S203), and determines whether or not there is a target entry having the same home address and the destination address as those in the acquired RR (S204).

If there is a target entry that has the same home address and the destination address (YES in S204), it is further determined whether the c/o address of the entry is different from the c/o address contained in the acquired registration request (S205). If the c/o address of the entry differs from that in the acquired RR (YES in S205), MSR 150 updates the c/o address of the entry so as to be in agreement with the c/o address contained in the registration request (S206).

Then, MSR 150 produces an erasing request ER having a destination address that is consistent with the latest c/o address immediately before the entry is updated. This erasing request ER also contains the home address of the entry and the destination address originally contained in the acquired registration request. This erasing request ER is transmitted (S207). Then, MSR 150 resets the expiration time (i.e., the lifetime) of the updated entry (S208).

If the c/o address of the retrieved entry is the same as that in the acquired registration request (NO in S205), the process jumps to S208 and the expiration time (i.e., the lifetime) of the retrieved entry is reset, without carrying out steps S206 and 207.

Then, MSR 150 sets its own address as the c/o address of the acquired RR to produce a new registration request (S209), and the routing operation is carried out to transmit the new registration request (S210).

If in step S204 there is no entry that has the home address and the destination address contained in the acquired registration request (NO in S204), a new entry that describes the home address, the c/o address, and the destination address contained in the acquired registration quest is produced and stored (S212).

Then, the steps S208 through S210 are carried out. Namely, the expiration time (i.e., the lifetime) of the entry is reset (S208), its own address of MSR 150 is set as the c/o address in RR (S209), and this registration request is transmitted under the routing operation (S210).

If in step S202 the acquired packet is not a registration request (NO in S202), MSR 150 determines whether the acquired packet is an erasing request (ER) addressed to the MSR 150 itself (S213). If the acquired packet is an erasing request addressed to the MSR 150 itself (YES in S213), MSR 150 erases the entry that has the home address in the erasing request and the destination address originally contained in a registration request (S214). Then, MSR 150 sets the c/o address of the erased entry as the destination address of a new erasing request (S215), and transmits the new erasing request (S210).

If in step S213 the acquired packet is not an erasing request addressed to the MSR 150 itself (NO in S213), it is determined whether the acquired packet is another kind of packet addressed to MSR 150 itself (S216). If the packet, which is neither RR nor ER, is addressed to MSR 150 itself (YES in S216), it is determined whether another data packet is encapsulated in the acquired packet (S217). If a data packet is encapsulated (YES in S217), the data packet is decapsulated (S218). If no data packet is encapsulated (NO in S217), a higher layer of the acquired packet is processed (S219).

If in step S216 the acquired packet is not addressed to MSR 150 itself (NO in S216), it is determined whether the destination address of the acquired packet is, found in an entry (S220). If the destination address is found in an entry (YES in S220), the acquired packet is encapsulated to produce a tunneling packet with the c/o address of the entry attached as a destination address of the tunneling packet (S221). Then, the routing operation is carried out to transmit the tunneling packet (S210).

In this manner, a packet is correctly transferred to the mobile node even if the mobile node moves between foreign links.

Thus, the packet transmission system according to the present invention can effectively prevent packet loss, which is a serious problem in the conventional art. As has been described in conjunction with the prior art, if a packet is transmitted from the home agent (HA) or the correspondent node (CN) before the registration request generated by a new foreign agent (or a new access router) reaches the home agent (HA) or the correspondent node (CN) in the conventional system, that packet is transferred to the previous foreign agent providing a link from which the mobile node has moved away.

Figure 21:
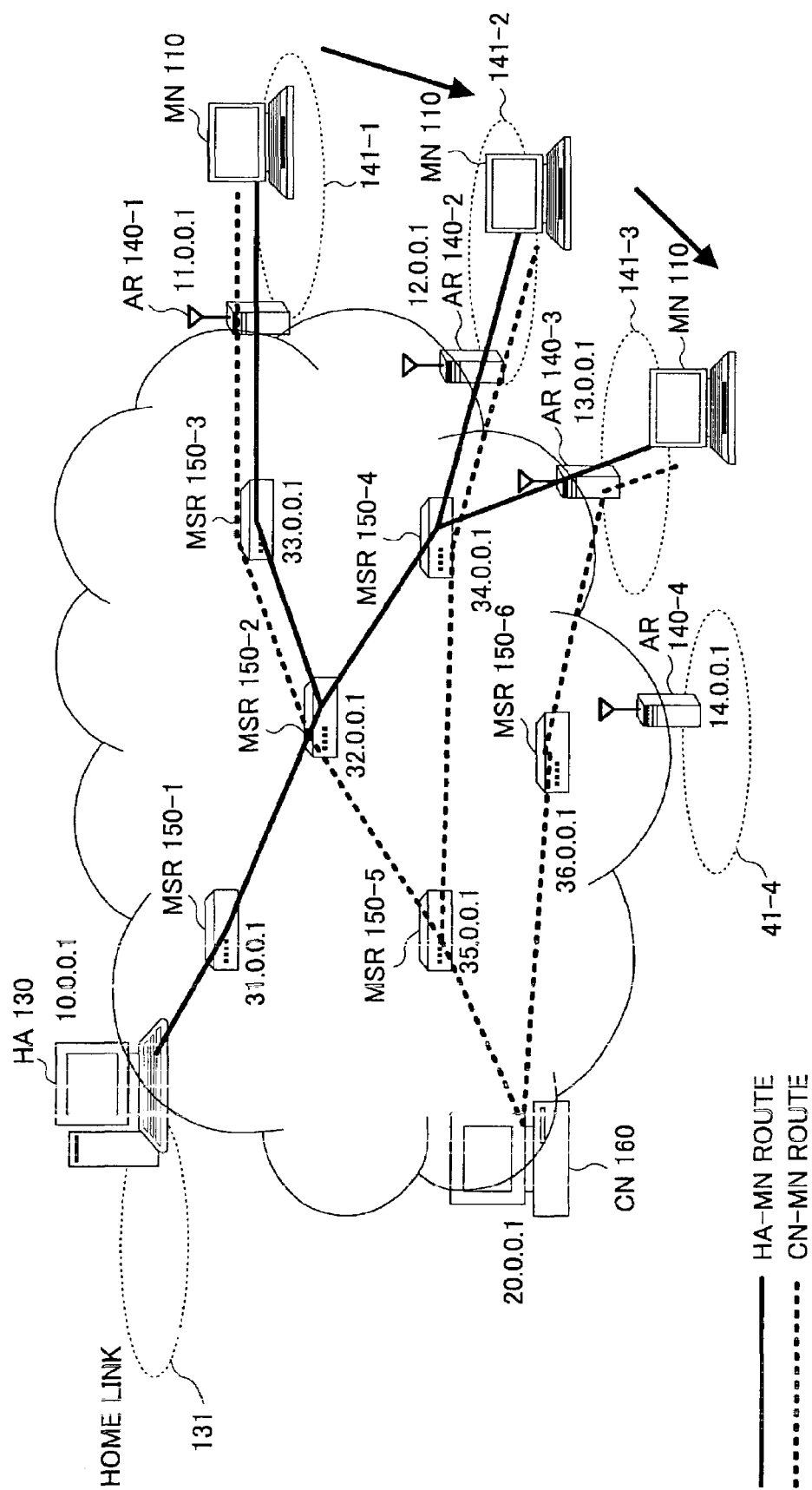
FIG. 21 is a diagram used to explain the advantages and effects of the present invention.

On the contrary, the packet transmission system according to the invention includes one or more MSRs, each functioning as a packet transmission route control apparatus, and the packet transmission route can be branched at each MSR, as illustrated in FIG. 21. Even if a new registration request transmitted from a new foreign agent (or a new access router) has not reaches the home agent (HA) or the correspondent node (CN) yet, a packet transmitted from the home agent or the correspondent node can be correctly relayed to the new foreign agent by an MSR (for example, MSR 150-2 or MSR 150-4 in FIG. 21) located at a branch, as long as the new registration request has reached that MSR on the way to the home agent or the correspondent node.

As long as a new registration request has reached an MSR, that MSR stores an entry having the home address of the mobile node and the c/o address from the latest node. Consequently, a packet transmitted from a counterpart correspondent node or a home agent is correctly relayed from that MSR to the new link based on the entry, using the c/o address recorded in the entry. With this arrangement, packet loss is greatly reduced.

Although the present invention has been described using an example of packet transmission based on the IPv4 addressing architecture, the present invention is not limited to this example, but is also applicable to IPv6 packet transmission systems.

In order to perform the operations illustrated in FIG. 13 and FIG. 20, each MSR has a packet acquisition unit that acquires a packet, including a registration request (RR), a data packet (DP), a tunneling packet (TP), and an erasing request (ER), which are transmitted between the mobile node and the home agent and/or the counterpart correspondent node. The packet acquisition unit carries out the steps S101 and S201 shown in FIG. 13 and FIG. 20, respectively.

The MSR also has a first entry storing unit. When receiving a first registration request at the packet acquisition unit, the first entry storing unit stores a first entry having the home address of the mobile node and a c/o address contained in the acquired first registration request. The first entry storing unit carries out S103-S107, S110, and S111 shown in FIG. 13, as well as S203-S206, S208, S211, and S212 shown in FIG. 20.

The MSR also has a registration request relay unit that updates the first registration request by changing the c/o address to its own address, and transmits the updated first registration request toward the home agent and/or the counterpart correspondent node. The registration request relay unit carries out S108 and S109 shown in FIG. 13, and S209 and S210 shown in FIG. 20.

The MSR also has a packet transfer unit. When acquiring a data packet addressed to the mobile node whose home address is recorded in the first entry, the packet transfer unit encapsulates the data packet to produce a tunneling packet, and transmits the tunneling packet to the c/o address recorded in the first entry in association with the home address. The packet transfer unit carries out S117 and S221 shown in FIG. 13 and FIG. 20, respectively.

The MSR also has an erasing request generating unit. When the c/o address of the first entry is updated to the new c/o address, the erasing request generating unit produces an erasing request addressed to the c/o address previously recorded in the first entry before the updating. The erasing request generating unit carries out S207 shown in FIG. 20.

This patent application is based on and claims the benefit of the earlier filing date of Japanese patent application No. 2001-245591 filed Aug. 13, 2001, the entire contents of which are hereby incorporated by reference.

What is claimed is:

1. A packet transmission system comprising:
   a home agent providing a home link and a home address to a mobile node;
   one or more access routers, each providing a foreign link and a c/o address to the mobile node when the mobile node has moved into the corresponding foreign link; and
   one or more mobility support routers that relay a packet to a destination between the mobile node and the home agent or a counterpart correspondent node wherever the mobile node is located, the mobility support router configured to acquire a first registration request addressed to the home agent and/or the counterpart correspondent node when the mobile node has moved into a first foreign link, store a first entry having the home address of the mobile node and the c/o address contained in the acquired first registration request, and update the first registration request changing the c/o address to its own address to pass the updated first registration request toward the home agent and/or the counterpart correspondent node;
   wherein each of the one or more mobility support routers processes the first registration request prior to relaying the first registration request (a) in a case when the first registration request contains the address of the mobility support router processing the first registration request, and (b) in a case when the first registration request is not addressed to the mobility support router processing the first registration request.

2. The packet transmission system according to claim 1, wherein when the mobility support router acquires a data packet addressed to the mobile node whose-home address is contained in the first entry, then the mobility support router encapsulates the data packet to produce a tunneling packet, and transmits the tunneling packet to the address recorded in the first entry in association with the home address.

3. The packet transmission system according to claim 2, wherein when the mobility support router has acquired a packet that is neither a registration request, nor a data packet addressed to the mobility support router itself, nor a packet with a destination address contained in the first entry, then the mobility support router carries out an ordinary routing operation for the acquired packet.

4. The packet transmission system according to claim 1, wherein when the home agent receives the updated first registration request, the home agent stores a second entry having the home address and the updated c/o address contained in the updated first registration request, and
wherein when the home agent acquires a data packet addressed to the mobile node whose home address is recorded in the second entry, the home agent encapsulates the data packet to produce a tunneling packet and transmits the tunneling packet to the updated address recorded in the second entry in association with the home address.

5. The packet transmission system according to claim 1, wherein when the number of the first entries stored in the mobility support router has reached a prescribed value, the mobility support router transmits the acquired first registration request as it is without storing a new first entry and without changing the c/o address contained in the first registration request.

6. The packet transmission system according to claim 1, wherein the mobility support router is configured to acquire a second registration request addressed to the home agent and/or the counterpart correspondent node when the mobile node has moved into a second foreign link, and to update the first entry by changing the address recorded in the first entry to a new c/o address contained in the second registration request.

7. The packet transmission system according to claim 6, wherein the first entry further has a destination address contained in the acquired first registration request, in association with the home address and the c/o address.

8. The packet transmission system according to claim 7, wherein when the c/o address of the first entry is updated to the new c/o address, the mobility support router produces and transmits an erasing request addressed to the c/o address previously recorded in the first entry in association with the home address and the destination address.

9. The packet transmission system according to claim 7, wherein when the mobility support router receives an erasing request containing the home address of the mobile node that has moved into the second foreign link, the mobility support router erases the first entry having that home address, and produces and transmits a new erasing request addressed to the c/o address recorded in the erased first entry in association with the home address and the destination address.

10. The packet transmission system according to claim 8, wherein when the mobility support router receives another erasing request that contains the home address recorded in the first entry from another mobility support router in the system, the mobility support router erases the first entry having the home address, and produces and transmits a new erasing request addressed to the c/o address recorded in the erased first entry in association with the home address and the destination address.

11. The packet transmission system according to claim 1, wherein the mobility support router discards the first entry when a predetermined time has passed since the first entry has been stored.

12. A packet transmission route control apparatus used in a packet transmission system that includes a home agent providing a home link and a home address to a mobile node, and one or more access routers, each providing a foreign link and a c/o address to the mobile node when the mobile node has moved into the corresponding foreign link, the packet transmission route control apparatus comprising:
a packet acquisition unit configured to acquire a first registration request addressed to the home agent and/or a counterpart correspondent node when the mobile node has moved into a first foreign link;
a first entry storing unit configured to store a first entry having the home address of the mobile node and the c/o address contained in the acquired first registration request; and
a registration request relay unit configured to update the first registration request by changing the address to its own address and transmit the updated first registration request toward the home agent and/or the counterpart correspondent node;
wherein the packet transmission route control apparatus processes the first registration request prior to relaying the first registration request (a) in a case when the first registration request contains the address of the packet transmission route control apparatus, and (b) in a case when the first registration request is not addressed to the packet transmission route control apparatus.

13. The packet transmission route control apparatus according to claim 12, further comprising:
a packet transfer unit configured to, when acquiring a data packet addressed to the mobile node whose home address is recorded in the first entry, encapsulate the data packet to produce a tunneling packet and transmit the tunneling packet to the c/o address recorded in the first entry in association with the home address, thereby relaying the packet to the mobile node wherever the mobile node is located.

14. The packet transmission route control apparatus according to claim 13, wherein when the packet acquisition unit has acquired a packet that is neither a registration request, nor a data packet addressed to the mobility support router itself, nor a packet with a destination address contained in the first entry, then the packet transfer unit carries out an ordinary routing operation for the acquired packet.

15. The packet transmission route control apparatus according to claim 12, wherein when the number of the first entries stored in the first entry storing unit has reached a prescribed value, then the first entry storing unit does not produce a new first entry for a newly acquired first registration request, the registration request relay unit does not change the c/o address contained in the newly acquired first registration request, and the packet transmission route control apparatus transmits the newly acquired first registration request as it is.

16. The packet transmission route control apparatus according to claim 12, wherein the packet acquisition unit is configured to acquire a second registration request addressed to the home agent and/or the counterpart correspondent node when the mobile node has moved into a second foreign link, and the first entry storing unit is configured to update the first entry by changing the c/o address recorded in the first entry to a new c/o address contained in the second registration request.

17. The packet transmission route control apparatus according to claim 16, wherein the first entry further has a destination address contained in the acquired first registration request, in association with the home address and the c/o address.

18. The packet transmission route control apparatus according to claim 17, further comprising:
an erasing request generating unit configured to produce and transmit an erasing request addressed to the c/o address previously recorded in the first entry in association with the home address and the destination address, when the c/o address of the first entry is updated to the new c/o address.

19. The packet transmission route control apparatus according to claim 17, wherein when the packet transmission route control apparatus receives an erasing request containing the home address of the mobile node, that has moved into the second foreign link, the first entry storing unit erases the first entry having that home address, the packet transmission route control apparatus further comprising
an erasing request generating unit configured to produce and transmit a new erasing request addressed to the c/o address recorded in the erased first entry in association with the home address and the destination address.

20. The packet transmission route control apparatus according to claim 18, wherein when the packet transmission route control apparatus receives another erasing request containing the home address recorded in the first entry from another packet transmission route control apparatus, the first entry storing unit erases the first entry having that home address, and the erasing request generating unit produces and transmits a new erasing request addressed to the address recorded in association with the home address and the destination address in the first entry.

21. The packet transmission route control apparatus according to claim 12, wherein the first entry storing unit discards the first entry when a predetermined time has passed since the first entry has been stored.

22. A method for controlling a packet transmission route in a packet transmission system including a home agent providing a home link and a home address to a mobile node and one or more access routers, each providing a foreign link and a c/o address to the mobile node when the mobile node has moved into the corresponding foreign link, the method comprising the steps of:
setting a mobility support router between the home agent and the access router;
acquiring, at the mobility support router, a first registration request produced by a first access router and addressed to the home agent and/or a counterpart correspondent node when the mobile node has moved into a first foreign link;
storing, at the mobility support router, a first entry having the home address of the mobile node and a c/o address contained in the acquired first registration request; and
updating, at the mobility support router, the first registration request by changing the address to its own address to pass the updated first registration request coward the home agent and/or the counterpart correspondent node;
wherein the mobility support router processes the first registration request prior to relaying the first registration request (a) in a case when the first registration request contains the address of the mobility support router, and (b) in a case when the first registration request is not addressed to the mobility support router.

23. The method according to claim 21, further comprising the steps of:
acquiring, at the mobility support router, a data packet addressed to the mobile node and containing the home address of the mobile node;
determining whether any first entry stored in the mobility support router has the same home address contained in the data packet;
encapsulating the data packet to produce a tunneling packet when there is the first entry having the same home address as that contained in the data packet; and
transmitting the tunneling packet to the c/o address recorded in the first entry in association with the home address contained in the data packet.

24. The method according to claim 22, further comprising the steps of:
acquiring a packet at the mobility support router;
determining whether the packet is either a registration request, a data packet addressed to the mobility support router itself, or a packet having a destination address that is contained in the first entry; and
carrying out an ordinary routing operation when the packet is neither the registration request, nor the data packet addressed to the mobility support router itself, nor the packet having a destination address contained in the first entry.

25. The method according to claim 22, further comprising the steps of:
receiving the updated first registration request at the home agent,
storing a second entry having the home address and the updated c/o address contained in the updated first registration request in the home agent,
acquiring, at the home agent, a data packet addressed to the mobile node and containing the home address of the mobile node;
determining, at the home agent, whether there is a second entry that has the home address contained in the data packet;
encapsulating the data packet to produce a tunneling packet when the second entry has the home address contained in the data packet; and transmitting the tunneling packet to the updated c/o address recorded in the second entry in association with the home address.

26. The method according to claim 22, further comprising the steps of:
determining whether the number of the first entries stored in the mobility support router has reaches a prescribed value; and
when the number of the first entries has reaches the prescribed value, transmitting the acquired first registration request as it is without storing a new first entry and without changing the c/o address contained in the first registration request.

27. The method according to claim 22, further comprising the steps of:
acquiring, at the mobility support router, a second registration request addressed to the home agent and/or the counterpart correspondent node when the mobile node has moved into a second foreign link; and
updating the first entry by changing the address recorded in the first entry to a new address contained in the second registration request.

28. The method according to claim 27, wherein the first entry further has a destination address contained in the acquired first registration request in association with the home address and the address.

29. The method according to claim 28, further comprising the steps of:

producing, at the mobility support router, an erasing request addressed to the c/o address previously recorded in the first entry in-association with the home address and the destination address, when the address of the first entry is updated to the new c/o address; and transmitting the erasing request from the mobility support router.

30. The method according to clam 28, further comprising the steps of:

receiving, at the mobility support router, an erasing request containing the home address of the mobile node that has moved into a second foreign link;

determining whether there is any first entry having the home address contained in the erasing request;

when there is the first entry having the home address contained in the erasing request, erasing the first entry;

producing a new erasing request addressed to a c/o address recorded in the erased first entry in association with the home address and the destination address; and transmitting the new erasing request.

31. The method according to claim 29, further comprising the steps of:

receiving, at the mobility support router, an erasing request transmitted from another mobility support router and containing a certain home address;

determining whether there is any first entry that has the certain home address contained in the erasing request;

when there is the first entry that has the certain home address contained in the erasing request, erasing the first entry;

producing a new erasing request addressed to the address recorded in the erased first entry in association with the certain home address and the destination address; and transmitting the new erasing request.

32. The method according to claim 20, further comprising the step of:

discarding the first entry when a predetermined time has passed since the first entry has been stored.

* * * * *